United States Patent
D'Alessandro et al.

(10) Patent No.: US 7,310,383 B2
(45) Date of Patent: *Dec. 18, 2007

(54) COAXIAL CABLE COMMUNICATIONS SYSTEMS AND APPARATUS EMPLOYING SINGLE AND MULTIPLE SINEWAVE MODULATION AND DEMODULATION TECHNIQUES

(75) Inventors: Kenneth D'Alessandro, Glenbrook, NV (US); Forrest J. Brown, Carson City, NV (US); Ronald E. Kunzel, Carson City, NV (US)

(73) Assignee: Data Flow Technologies, Inc., Carson City, NV (US)

( * ) Notice: Subject to any disclaimer, the term of this patent is extended or adjusted under 35 U.S.C. 154(b) by 266 days.

This patent is subject to a terminal disclaimer.

(21) Appl. No.: 11/104,301

(22) Filed: Apr. 11, 2005

(65) Prior Publication Data
US 2005/0286645 A1    Dec. 29, 2005

Related U.S. Application Data

(63) Continuation-in-part of application No. 10/825,789, filed on Apr. 16, 2004, now Pat. No. 7,046,741.

(51) Int. Cl.
*H04L 27/04* (2006.01)
(52) U.S. Cl. .................. 375/300; 375/268
(58) Field of Classification Search ............ 375/259, 375/260, 268, 300, 320; 332/149; 455/108
See application file for complete search history.

(56) References Cited

U.S. PATENT DOCUMENTS

| 6,574,284 | B1 | 6/2003 | Jordan ..................... 375/268 |
| 6,621,426 | B1 | 9/2003 | van Nguyen ............... 341/50 |
| 6,912,567 | B1 * | 6/2005 | Allard et al. ............... 709/223 |
| 7,046,741 | B2 * | 5/2006 | Brown et al. ............... 375/300 |

OTHER PUBLICATIONS

Walker, Harold R., "Understanding Ultra Narrowband Modulation", *Microwaves & RF*, pp. 53-54, 56, 58, 60-61, Dec. 2003.

* cited by examiner

*Primary Examiner*—David B. Lugo
(74) *Attorney, Agent, or Firm*—Sierra Patent Group, Ltd.

(57) ABSTRACT

A method for generating a substantially sinusoidal waveform containing encoded digital data having one of a first value and a second value at selected phase angles $\theta_n$ comprises generating the waveform having an amplitude Y defined by a first function at phase angles lying outside of regions having a range $\Delta\theta$ beginning at each phase angle $\theta_n$, said first function being $Y=\sin\theta$; generating the waveform having an amplitude Y defined by the first function at phase angles lying inside the regions having a range of $\Delta\theta$ beginning at each phase angle $\theta_n$ where data of the first value is to be encoded; and generating the waveform having an amplitude Y defined by a second function at phase angles lying inside the regions having a range of $\Delta\theta$ associated with each phase angle $\theta_n$ where data of the second value is to be encoded, the second function being different from $Y=\sin\theta$.

3 Claims, 20 Drawing Sheets

Multi-bit Sinewave Receiver Block Diagram

COAXIAL CABLE COMMUNICATIONS SYSTEMS AND APPARATUS EMPLOYING SINGLE AND MULTIPLE SINEWAVE MODULATION AND DEMODULATION TECHNIQUES

CROSS-REFERENCE TO RELATED APPLICATIONS

This application is a continuation-in-part of U.S. patent application Ser. No. 10/825,789, filed Apr. 16, 2004, now U.S. Pat. No. 7,046,741 which is hereby incorporated by reference herein.

BACKGROUND OF THE INVENTION

1. Field of the Invention

The present invention relates to coaxial-cable communications systems. More particularly, the present invention relates to coaxial-cable communications systems employing single and multiple sinewave modulation techniques, and apparatus for modulating and demodulating information according to the modulation techniques in coaxial-cable communications systems employing the modulation techniques.

2. The Prior Art

Digital data is often transferred from point to point by exploiting one or more of the three characteristic properties of an AC signal: Amplitude, Frequency and Phase.

Some of the modulation methods using the amplitude property of carriers are OOK (On-Off Keying) and common AM (amplitude modulation). In OOK a data bit is represented by the presence or absence of a carrier (full amplitude or zero amplitude). In AM data bits are represented by a difference in the relative amplitude of the carrier or by using different frequency tones representing the digital data to amplitude modulate a carrier.

Typical modulation methods using the frequency property are FSK (Frequency Shift Keying) and FM (frequency modulation). With FSK the binary states of digital data are represented with abrupt frequency changes between two predetermined fixed frequencies. In FM data bits are represented by a difference in the relative frequency of the carrier or by using different tones representing the digital data to frequency modulate a carrier.

Phase modulation is also a common modulation method also but when used alone is difficult to distinguish from FM. Recently more sophisticated modulation methods have evolved and have been exploited. As an example a relatively new and popular modulation method is QAM (Quadrature Amplitude Modulation), which uses a combination of amplitude and phase modulation. There are several different variations of QAM depending on the application.

Each of these modulation methods is viable, proven and used in appropriate communications applications. A few undesirable characteristics common to all of these modulation methods is they all require several cycles to transmit one bit and in doing so generate significant sidebands. These sidebands are necessary to extract the information from the carrier and take up significant bandwidth in the communications channel, requiring significant spacing between adjacent signals.

BRIEF DESCRIPTION OF THE INVENTION

A modulation technique according to the present invention employs one or more sinusoidal carriers. Digital data comprising a number of digital bits are encoded within each half of the sinusoidal cycle. Each individual one of n bits is located at a predetermined phase angle of the cycle $\theta_n$. One digital representation (for example a "zero") is represented by no change occurring in the amplitude Y of the sinusoidal waveform at the phase angle $\theta_n$. The other digital representation (for example a "one") is represented by altering the sinusoidal waveform at the phase angle $\theta_n$. As presently preferred, the sinusoidal waveform is altered by maintaining the amplitude $Y = \sin \theta_n$ for a short interval $\Delta\theta$ following the phase angle $\theta_n$. Alternatively, the sinusoidal waveform could be altered by increasing (or decreasing) the amplitude of the sinusoidal waveform and then maintaining the amplitude $Y = \sin \theta_{(n+\Delta\theta)}$ for the short interval $\Delta\theta$ following the phase angle $\theta_n$.

As presently preferred, but not necessary, every other bit is inverted (i.e., a "one" is inverted to a "zero" and a "zero" is inverted to a "one"). Either or both of the number of bits n and the phase angles phase angle $\theta_n$ may be adaptively altered or may be selectively altered for a number of purposes.

In embodiments where a plurality of sinusoidal carriers are employed, the sinusoidal carriers may be related in frequency such that they may be generated having a phase relationship characterized by all of the carriers simultaneously being at zero degrees ($\sin \theta = 0$) periodically.

A demodulation technique according to the present invention detects the modulated carrier and retrieves the digital data by examining it to determine whether the sinusoidal function of the carrier has been altered at an interval $\Delta\theta$ following each phase angle $\theta_n$. For, example, if the carrier has been modulated by maintaining the amplitude $Y = \sin \theta_n$ for a short interval $\Delta\theta$ following the phase angle $\theta_n$, the modulated carrier is examined to determine if $Y = \sin \theta_n$ during the interval $\Delta\theta$ following the phase angle $\theta_n$ or whether the amplitude has been following the function $Y = \sin \theta$ during the interval $\Delta\theta$ following each phase angle $\theta_n$. Such examination may be accomplished, for example, by mixing the detected sinusoidal carrier with a reference sinusoidal signal having the same frequency and phase as the carrier to detect phase differences between the reference sinusoidal signal and the modulated carrier, or by performing fast-fourier-transform (FFT) analysis on the modulated carrier. The digital data may then be buffered or otherwise processed and utilized as known in the digital data art.

An exemplary modulation apparatus according to the present invention may be employed to digitally generate the modulated carrier. A counter may be used to drive a digital-to-analog (D/A) converter through a sine-function lookup table as is known in the art to generate a sinusoidal output voltage from the D/A converter. The output of the counter at points in time representing $\theta_n$ may be latched into the sine-function lookup table if it is desired to maintain the output of the D/A converter at the value $Y = \sin \theta$ during the interval $\Delta\theta$. At the end of the interval $\Delta\theta$, the latch is released and the then-current-count output of the counter is presented to the lookup table. According to one embodiment of the invention, the bit rate is adaptable.

One exemplary demodulation apparatus according to the present invention may be employed to extract the digital information from the modulated carrier. The modulated carrier is used to generate a reference sinusoidal signal having the same frequency and phase as the modulated carrier. The modulated carrier and the reference sinusoidal signal are mixed in a double-balanced mixer. Digital circuitry examines the output of the mixer during a time window including and just following the interval $\Delta\theta$ for a signal indicating a phase change between the modulated carrier and the reference sinusoidal signal. The sensed signals become the digital output stream of the demodulator.

Another exemplary demodulation apparatus uses optical techniques to extract digital information from the modulated carrier. These techniques exploit the fact that the brightness of a LED will be higher during the presence of an encoded bit.

One communications system according to the present invention employs a modulator to insert at least one modulated carrier according to the present invention onto one end of a telephone line or other wire-pair communications line. Preferably, a plurality of such modulated carriers, separated in frequency by a guard-band amount, are injected into the line. A demodulator is coupled to the other end of the telephone line or other wire-pair communications line. According to one embodiment of the invention, a modulator and the demodulator may be located at each end of the line and the communications may be two-way communications. According to another embodiment of the invention, the modulator and the demodulator may negotiate a bit rate to be used in the communications.

Another communications system according to the present invention employs a modulator to insert at least one modulated carrier according to the present invention onto a power distribution line. Preferably, a plurality of such modulated carriers, separated in frequency by a guard-band amount, are injected into the line. A demodulator is coupled to the power distribution line at a customer location such as a home or business at, for example, a conventional duplex outlet. According to one embodiment of the invention, the communications may be two-way communications. According to another embodiment of the invention, the modulator and the demodulator may negotiate a bit rate to be used in the communications. According to yet another embodiment of the invention the communications system may be used by a power utility to regulate loads during periods of high load demand by selectively switching appliances and lighting circuits at the customer location.

Another communications system according to the present invention employs a modulator to insert at least one modulated carrier according to the present invention onto one end of a coaxial-cable communications line. The modulated carriers may be up-converted in frequency prior to being inserted onto the coaxial cable line. Preferably, a plurality of such modulated carriers, separated in frequency by a guard-band amount, are inserted into the line. A demodulator is coupled to the other end of the coaxial cable communications line. According to one embodiment of the invention, a modulator and the demodulator may be located at each end of the line and the communications may be two way communications. According to another embodiment of the invention, the modulator and the demodulator may negotiate a bit rate to be used in the communications.

Another communications system according to the present invention employs a modulator to generate at least one modulated carrier according to the present invention and to further modulate a radio-frequency (RF) carrier with the at least one modulated carrier to form a wireless RF signal. The modulated carriers may be up-converted in frequency prior to being RF modulated. Preferably, a plurality of such modulated carriers, separated in frequency by a guard-band amount, are RF modulated. The RF modulated signal is then transmitted. The transmitted RF modulated signal is then detected by a terrestrial RF receiver. A demodulator is coupled to the terrestrial RF receiver. According to one embodiment of the invention, the communications may be two-way communications. According to another embodiment of the invention, the modulator and the demodulator may negotiate a bit rate to be used in the communications.

Another communications system according to the present invention employs a modulator to generate at least one modulated carrier according to the present invention and to further modulate a radio-frequency (RF) carrier with the at least one modulated carrier to form a wireless RF signal. The modulated carriers may be up-converted in frequency prior to being RF modulated. Preferably, a plurality of such modulated carriers, separated in frequency by a guard-band amount, are RF modulated. The RF modulated signal is then transmitted to an earth-orbiting or other satellite or spacecraft. A demodulator is coupled to the RF receiver in the earth-orbiting or other satellite or spacecraft. The earth-orbiting or other satellite or spacecraft may then retransmit the RF signal to another RF receiver or may demodulate it for local use. According to one embodiment of the invention, the communications may be two-way communications. According to another embodiment of the invention, the modulator and the demodulator may negotiate a bit rate to be used in the communications.

BRIEF DESCRIPTION OF THE DRAWING FIGURES

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Figure 1A:
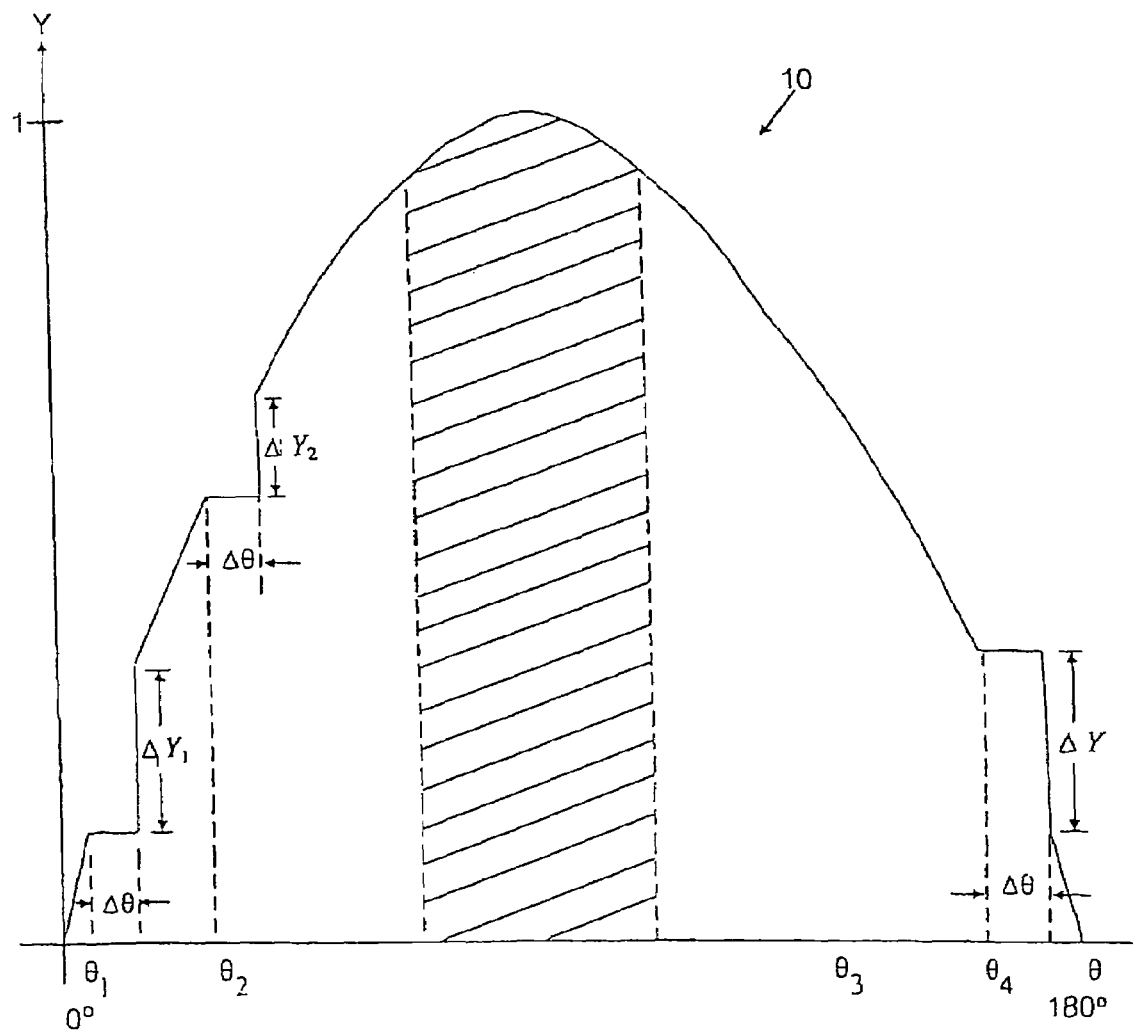
FIG. 1A is a diagram illustrating an exemplary single sinusoidal carrier modulated according to the techniques of the present invention.

Referring first to FIG. 1A is a diagram illustrates an exemplary single sinusoidal carrier 10 modulated according to the techniques of the present invention. A positive half cycle of a sinusoidal wave is shown in FIG. 1A. The x-axis of FIG. 1A is the phase angle of the sinusoidal carrier 10 from 0° through 180° and the y-axis of FIG. 1A is the instantaneous amplitude of sinusoidal carrier 10 normalized to a peak value of 1 at a phase angle of 90° as is known in the art. Persons of ordinary skill in the art will appreciate from an examination of FIG. 1A how the encoding of the second half cycle of the sinusoidal carrier 10 from 180° through 360° is performed.

According to then present invention n digital bits are encoded within each half of the sinusoidal cycle. Each individual one of n bits is located at a predetermined phase angle of the cycle $\theta_n$. One digital representation (for example a "zero") is represented by no change occurring in the amplitude Y of the sinusoidal waveform at the phase angle $\theta_n$. The other digital representation (for example a "one") is represented by altering the sinusoidal waveform at the phase angle $\theta_n$. As presently preferred, the sinusoidal waveform is altered by maintaining the amplitude Y=sin $\theta_n$ for a short interval $\Delta\theta$ following the phase angle $\theta_n$. As presently preferred, every other bit is inverted (i.e., a "one" is inverted to a "zero" and a "zero" is inverted to a "one"). Persons of ordinary skill in the art will appreciate that alterations of the sinusoidal carrier other than maintaining the voltage constant during the interval $\Delta\theta$ following the phase angle $\theta_n$, are possible in accordance with the teachings of the present invention. For example, the sinusoidal waveform could be altered by increasing (or decreasing) the amplitude of the sinusoidal waveform and then maintaining the amplitude Y=sin $\theta_{(n+\Delta\theta)}$ for the short interval $\Delta\theta$ following the phase angle $\theta_n$. Combinations of these two techniques may be employed according to the present invention.

In FIG. 1A, n is selected to be 4 solely for purposes of ease in illustrating the present invention. The present invention is not limited to encoding 4 digital bits per half cycle of sinusoidal carrier 10 and persons of ordinary skill in the art will observe that other numbers of bits may be encoded per half cycle of sinusoidal carrier 10. The locations of the encoded bits on the carrier 10 are shown at phase angles $\theta_1$, $\theta_2$, $\theta_2$, and $\theta_4$, respectively. These bit positions are shown in FIG. 1A symmetrically located. Such positioning, while convenient for performing the demodulation of the signal, is not necessary in accordance with the present invention.

For purposes of FIG. 1A, a "zero" data value is represented by no change occurring in the amplitude Y of the sinusoidal waveform and a "one" is represented by altering the amplitude Y of the sinusoidal waveform. In the example of FIG. 1A, a modulation technique is used wherein every other bit is inverted (i.e., a "one" is inverted to a "zero" and a "zero" is inverted to a "one"). Therefore, bits 2 and 4 are shown inverted in FIG. 1A. While this modulation technique (inverting every other bit) is presently preferred, persons of ordinary skill in the art will appreciate that this is not necessary for practicing the present invention.

FIG. 1A illustrates encoding the four-bit sequence 1000, in which bits 2 and 4 are inverted so that the encoded sequence is shown as 1101 encoded in the first half cycle of sinusoidal carrier 10. Thus, starting at phase angle $\theta_1$ and for a short interval $\Delta\theta$ following the phase angle $\theta_1$, the sin $\theta$ function becomes discontinuous and the Y value is held constant at the value Y=sin $\theta_1$. At the end of the interval $\Delta\theta$, the Y value jumps up to Y=sin $[\theta_1+\Delta\theta]$. Similarly, starting at phase angle $\theta_2$ and for a short interval $\Delta\theta$ following the phase angle $\theta_2$, the sin $\theta$ function becomes discontinuous and the Y value of the function is held constant at the value Y=sin $\theta_1$, since an inverted "0" (a "1") is being encoded. At the end of the interval $\Delta\theta$, the Y value rises to Y=sin $[\theta_2+\Delta\theta]$. There is no interruption of the sin $\theta$ function at the angle interval $\Delta\theta$ immediately following phase angle $\theta_3$, since a zero is being encoded at that location. Finally, starting at phase angle $\theta_4$ and for a short interval $\Delta\theta$ following the phase angle $\theta_4$, the Y value of the function is held constant at the value Y=sin $\theta_4$, since an inverted "0" (a "1") is being encoded. At the end of the interval $\Delta\theta$, the Y value falls to Y=sin $[\theta_2+\Delta\theta]$.

From an examination of the first and fourth encoded bits, persons of ordinary skill in the art will observe that the portions of the waveform at encoded bits at phase angles $\theta_1$ and $\theta_2$ are not symmetrical. At phase angles of less than 90° the rise of the Y value is delayed and at phase angles of greater than 90° the fall of the Y value is delayed. In both cases, however, the abrupt change in the Y value ($\Delta Y$) occurs at the end of the interval $\Delta\theta$, during which Y has been constant. This is the abrupt change that will be sensed by the detector to demodulate the signal and extract the digital information. As previously noted, persons of ordinary skill in the art will appreciate that at phase angles greater than 90° the abrupt change could be caused to occur at the beginning of the interval $\Delta\theta$ or that the abrupt change in amplitude could be at the beginning of the interval at phase angles less than 90° and at the end of the interval at phase angles greater than 90°.

A central portion of the sinusoidal carrier 10 symmetrically located around 90° is identified in FIG. 1A by diagonal hatching. It is believed that, as a practical matter, there is some range of phase angles symmetrically located around 90° for which the abrupt change $\Delta Y$ in the value of Y will be difficult or impossible to detect since d sin $\theta$/d$\theta$ (i.e., cos $\theta$) approaches zero as $\theta$ approaches 90° from both directions. This can be seen by comparing $\Delta Y1$ and $\Delta Y2$ and noting that the latter is a smaller amplitude change. It is therefore presently preferred to avoid locating the bit positions near the phase angle $\theta$=90°. The size of this exclusion zone will depend on factors such as, but not limited to, the detection scheme employed, the transmission medium employed, and the ambient noise level in the transmission medium.

Persons of ordinary skill in the art will appreciate that variations of the modulation technique disclosed with reference to FIG. 1A are possible without departing from the concepts of the present invention. For example, this aspect of the invention has been disclosed with respect to use of a constant phase-angle interval $\Delta\theta$ to produce a resultant abrupt change in the value of abrupt change in the voltage value of Y. It is also contemplated to use a constant abrupt change in the voltage value $\Delta Y$ with the result that the magnitude of the phase-angle interval $\Delta\theta$ will depend on the angular position at which the change in the voltage value $\Delta Y$ is desired. In addition, the voltage during the interval $\Delta\theta$ in the example of FIG. 1A is held constant at the value Y=sin $\theta_n$, but other functions could be employed. Other techniques, such as combinations of the constant phase angle $\Delta\theta$ and the constant abrupt change in the voltage value $\Delta Y$, could be used.

Figure 1B:
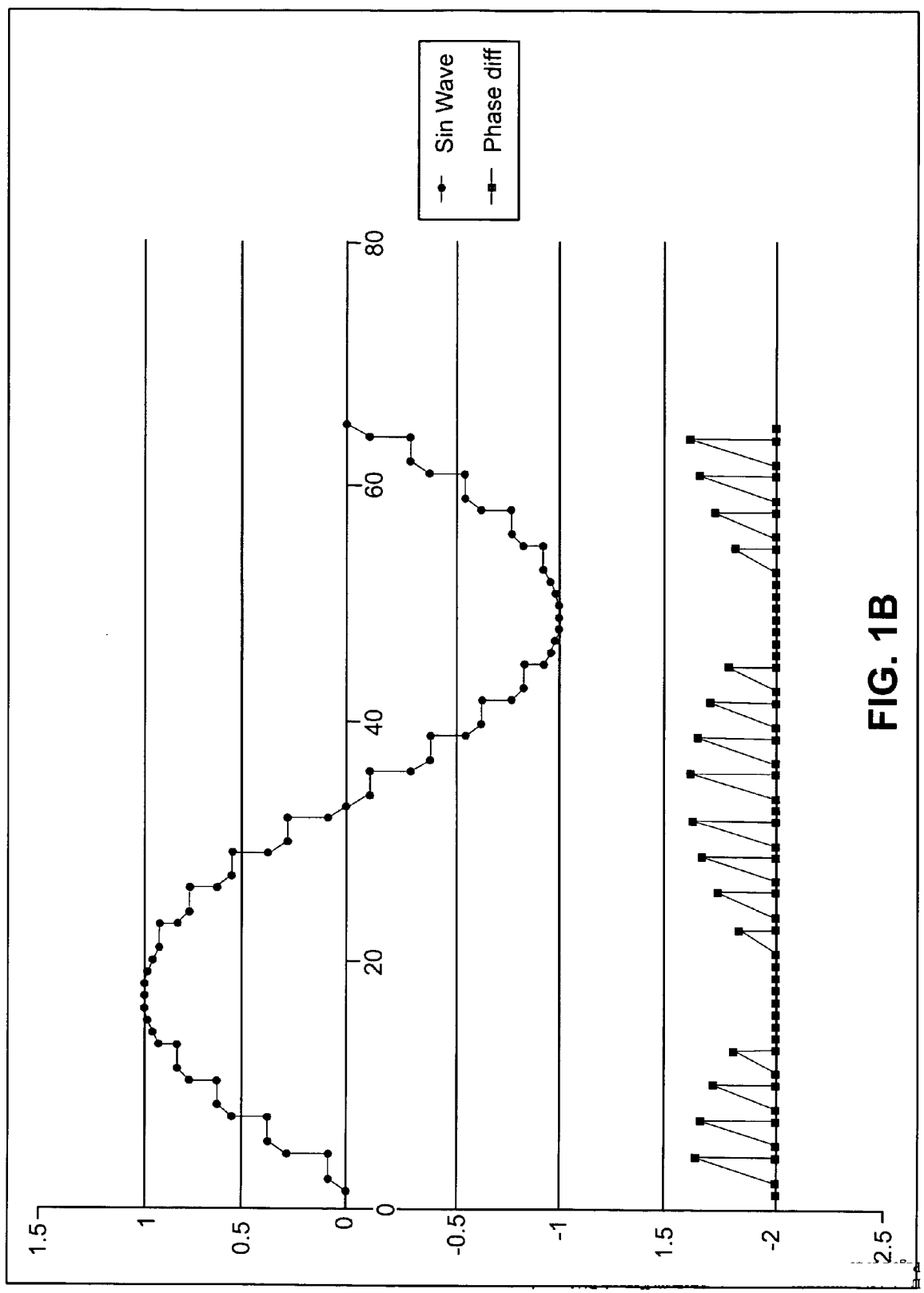
FIG. 1B is a graph of voltage vs. time of both a single cycle of a sinewave carrier modulated according to the techniques of the present invention and of exemplary data detected from that carrier.

Referring now to FIG. 1B, a graph of voltage vs. time of both a single cycle of a sinewave carrier modulated according to the techniques of the present invention and of exemplary data detected from that carrier is presented. In the upper trace, a single cycle of a sinewave carrier is shown modulated with four bits per half cycle. In the lower trace, a representation is shown of the voltage that would be detected from that carrier using the techniques of the present invention. The absence of encoded data in the region symmetrical about 90° is noted.

Figure 2:
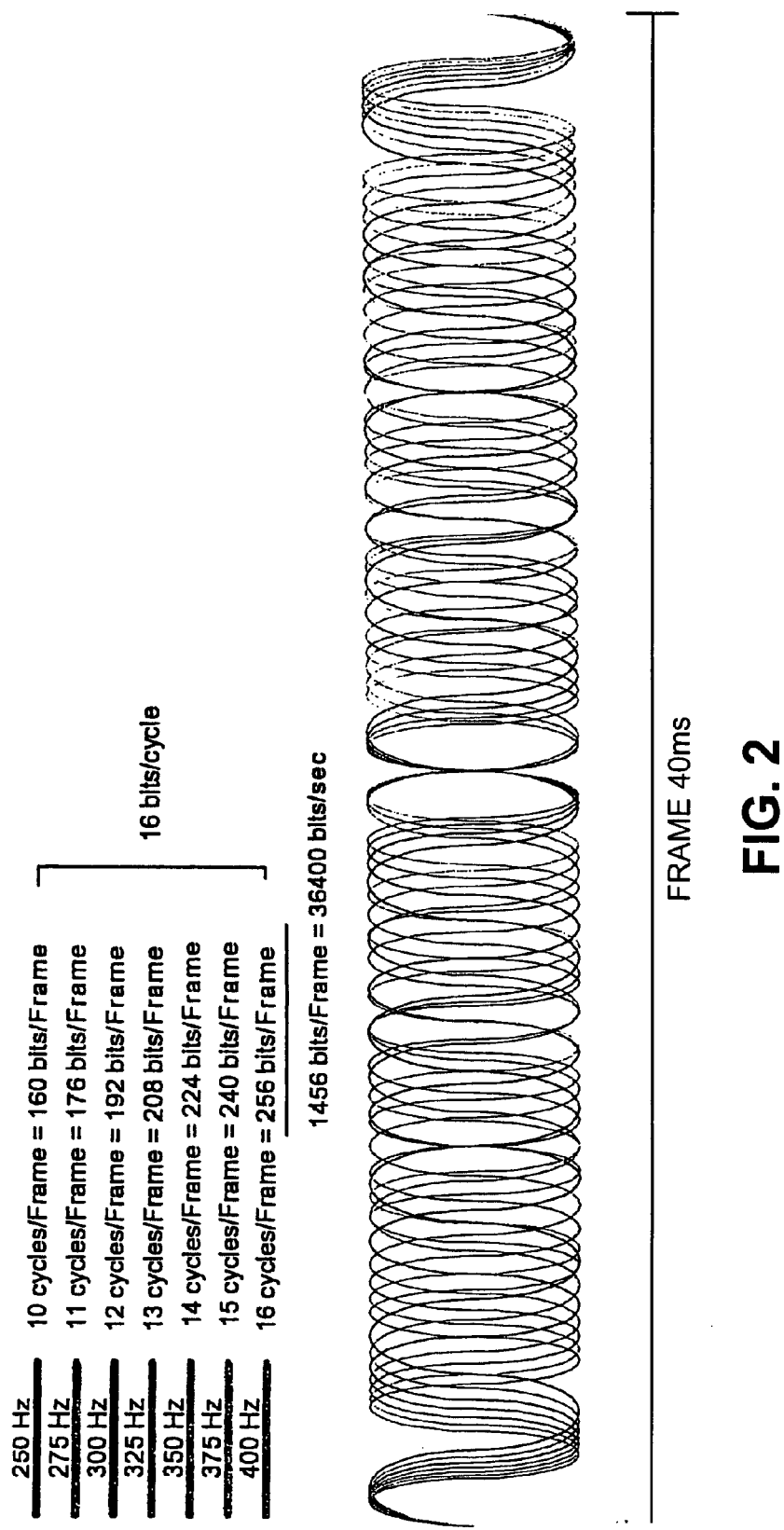
FIG. 2 is a diagram illustrating a plurality of sinusoidal carriers that may be modulated according to the techniques of the present invention.

Referring now to FIG. 2, a diagram illustrates another aspect of the present invention in which a plurality of sinusoidal carriers may be modulated with different digital data in the same communications channel according to the techniques of the present invention. In the illustrative example of FIG. 2, it may be seen that portions of seven sinusoidal carriers are shown within a 40 mS "frame" wherein all of the carriers are at a phase angle of zero at the beginning of each frame. Persons of ordinary skill in the art will understand that this can be readily accomplished by selecting carrier frequencies that are mathematically related in frequency. In the illustrative example of FIG. 2, carrier frequencies starting at 400 Hz and spaced apart by 25 Hz (i.e., 250 Hz, 275 Hz, 300 Hz, 325 Hz, 350 Hz, 375 Hz, and 400 Hz have been selected. As shown in the particular example illustrated in FIG. 2, the use of 16 bits per cycle results in a data rate of 1,456 bits per frame or 36,400 bits per cycle.

As may be seen from FIG. 2, the carriers are mathematically related such that ten complete cycles of a first carrier, eleven complete cycles of a second carrier, twelve complete cycles of a third carrier, thirteen complete cycles of a fourth carrier, fourteen complete cycles of a fifth carrier, fifteen complete cycles of a sixth carrier, and sixteen complete cycles of a seventh carrier are contained within the frame. Such framing, wherein all of the carriers are at a phase angle of zero at the beginning of each frame, is not necessary for practicing the present invention using multiple carriers, but it may be advantageously employed for data recovery and other synchronization activities in a communications system according to the present invention. For example, the frame-start phasing illustrated in FIG. 2 may be used for synchronization purposes etc.

This multiple-carrier aspect of the present invention can be employed to expand the total bandwidth that may be available in a given communications channel. For example, as will be disclosed herein, the bandwidth of a typical twisted-pair telephone line is about 3 KHz. According to the present invention, a plurality of sinusoidal carriers may each be spaced about 50-100 Hz apart in frequency within this frequency range and transmitted over the same telephone line. This can be used to significantly increase the usable bandwidth in any communication channel in which the present invention is employed. Persons of ordinary skill in the art will recognize from this disclosure that other frequency separations will be useable at other frequencies. For example, at a frequency of about 100 MHz, a plurality of sinusoidal carriers may be spaced apart from one another by about 500 KHz. Persons of ordinary skill in the art will understand that, in any given system realized according to the present invention, the required carrier spacing is simply that necessary to avoid interference from adjacent carrier frequencies during detection and will depend on the frequency range utilized, as well as the detection techniques that are employed.

According to another aspect of the present invention, secure communications may be accomplished by selecting combinations of two or more carrier frequencies. Authorized transmissions in such a system may be identified by receivers configured to detect the presence of the selected combination of carrier frequencies. According to one aspect of the present invention, communications systems may be adaptive and may use information sent over a control channel or frequency shifts detected by the receiver to shift the frequency of one or more carriers for purposes such as noise avoidance or minimization, security purposes, enabling multiple modes of communications, identifying messages intended for selected receivers, identifying events, etc. The purposes for which this aspect of the invention may be implemented will vary widely and are largely a matter of design choice.

Figure 3:
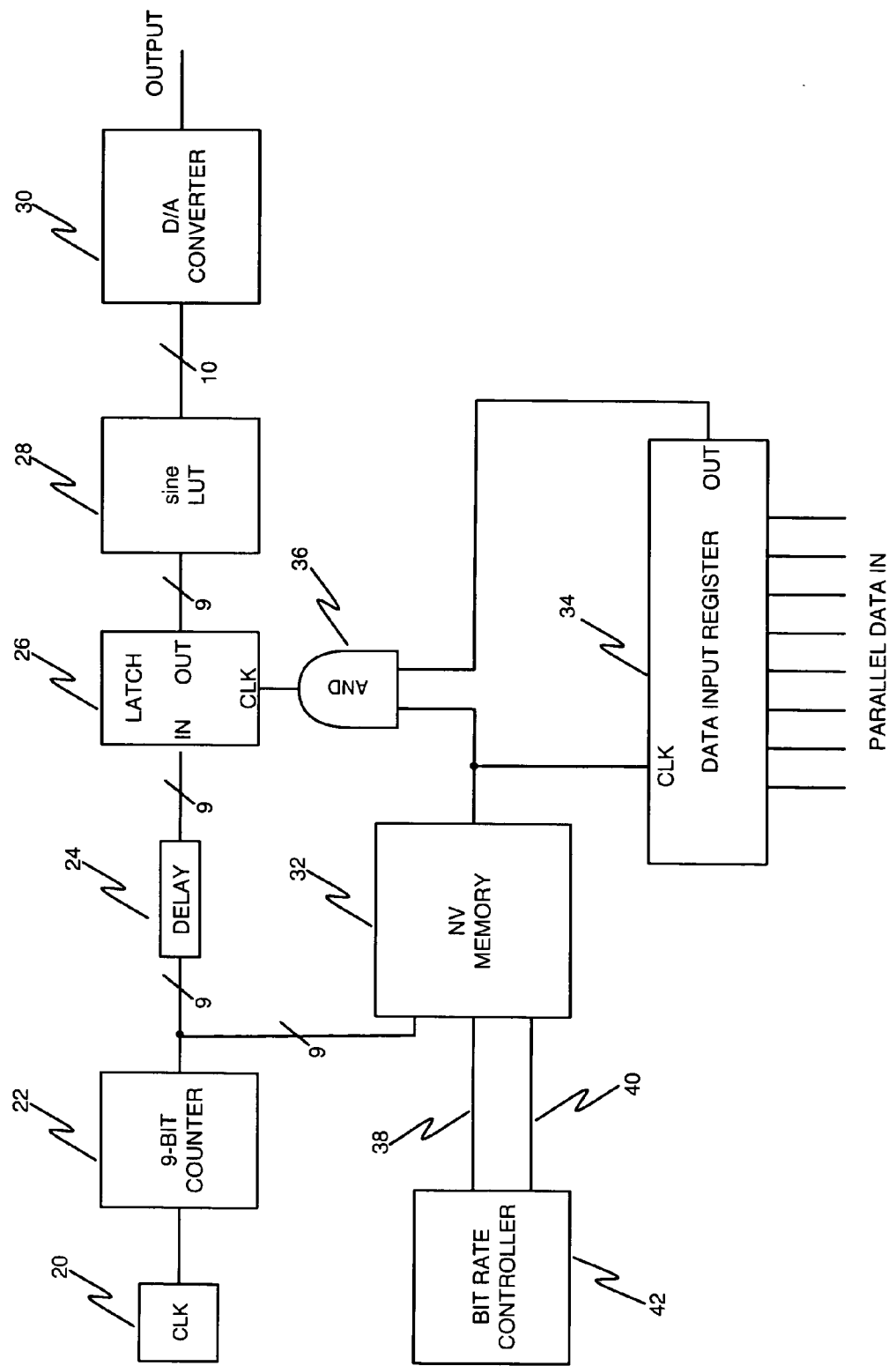
FIG. 3 is a block diagram of an illustrative modulator circuit for generating a modulated sinusoidal carrier according to the techniques of the present invention.

Referring now to FIG. 3, a block diagram depicts an illustrative modulator circuit for generating a modulated sinusoidal carrier according to the techniques of the present invention. The modulator of FIG. 3 is only illustrative, and persons of ordinary skill in the art will recognize that other schemes, such as a programmed microprocessor and digital signal processing (DSP) techniques, state machines, etc., may be employed to perform this function.

Generation of a sinusoidal voltage by use of a sine-function lookup table driving a D/A converter is known. The phase angles from 0° to 360° are quantized to a number of discrete values. A multi-bit counter continuously counts through these discrete values at a constant clock rate. The output of the multibit counter addresses the sine-function lookup table that provides the digital encoded sine-function value for each quantized phase angle. The D/A converter outputs a voltage proportional to the sine of the discrete phase angle at the input of the lookup table.

The two variables are the phase-angle resolution and the resolution of the A/D converter. In the illustrative modulator circuit of FIG. 3, the phase angle range of 0° to 360° is shown resolved to 9 bits, or one part in 512, making each increment of θ=0.703125°. Persons of ordinary skill in the art will appreciate that other resolutions could be employed, although the number of bits that may be encoded in a half cycle of the sinusoidal carrier may be limited for smaller resolutions. For example, using a 9-bit resolution of θ, each half cycle is resolved into 256 discrete angles. It is believed that a practical limit of 64 bits may be achievable using this angular resolution.

Similarly, the resolution of the D/A converter should be selected so that the step size is small enough to provide a relatively low amount of distortion in an unmodulated sinusoidal carrier generated therefrom. It is presently preferred that the resolution of the D/A converter be at about 10 bits. Persons of ordinary skill in the art will appreciate that the resolution of the D/A converter will affect the ability to use FFT demodulating techniques, since it is desirable that the smallest contemplated ΔY be significantly larger than the D/A step size.

Discrete logic elements are depicted in FIG. 3. Persons of ordinary skill in the art will appreciate that these elements can be fabricated using different technologies such as bipolar technology, CMOS technology, etc., and that logic families such as TTL, ECL, etc., may be chosen depending on the speed requirements dictated by the operating frequencies for which the circuits are designed. Further, such skilled persons will understand that these elements may be integrated onto a single integrated circuit, or that these elements could be programmed into a programmable integrated circuit such as a field programmable gate array or that the logic functions performed could be realized as a state machine.

In FIG. 3, clock generator 20 is shown driving 9-bit binary counter 22. The 9-bit count output from counter 22 is provided through delay element 24 to latch 26. Latch 26 is configured to be transparent while its clock input is low and to latch at its output the 9-bit value appearing on its input when its clock input becomes high. The output of latch 26 is used to drive sine lookup table 28. The output of sine lookup table 28 drives D/A converter 30. D/A converter 30 is shown in FIG. 3 having a resolution of 10 bits in FIG. 3, but from this disclosure, persons of ordinary skill in the art will understand that different resolutions may be employed. The modulated sinusoidal carrier of FIG. 1A appears at the output of D/A converter 30. Persons of ordinary skill in the art will appreciate that, in the 9-bit counter example of FIG. 3, the frequency of clock generator 20 is selected to be 512 times the desired sinusoidal carrier frequency.

Modulation may be applied to the sinusoidal carrier by temporarily freezing the input to sine lookup table 28 for a number of clock pulses whose periods together equal the desired time interval corresponding to Δθ. Experienced digital designers will appreciate that there are numerous ways in which to accomplish this.

One illustrative example of an extremely flexible method for performing this modulation technique is shown in FIG. 3 using non-volatile memory 32. Non-volatile memory 32 may be any sort of non-volatile memory, such as a mask ROM, PROM, EPROM, EEPROM, flash memory, etc.

The 9-bit count output from counter 22 is also provided to the 9 least significant bits of non-volatile memory 32, which then has one location corresponding to each discrete phase angle into which the sinusoidal carrier is resolved. In the circuit of FIG. 3, memory locations in non-volatile memory 32 corresponding to phase angles in the ranges [θ$_1$+Δθ], [θ$_2$+Δθ], [θ$_3$+Δθ], and [θ$_4$+Δθ] contain the value "1" and memory locations in non-volatile memory 32 corresponding to phase angles outside of these ranges contain the value "0".

The data to be encoded is transferred to data input register 34. Data input register 34 is a parallel-in serial-out register. Data input register 34 is loaded with n bits of data, n being the number of bit positions that may be encoded into a half cycle of the sinusoidal carrier. Data input register 34 is falling-edge clocked by the data output of non-volatile memory 32. Prior to the first clock pulse, the first data bit appears at the serial output of data input register 34. When the output count of 9-bit counter 22 reaches the value corresponding to the phase angle location of the first data bit to be encoded, the output of non-volatile memory 32 presents a "1" value as previously disclosed. If the value of the first data bit appearing at the serial output of data input register 34 is also a "1" value, the output of AND gate 36 becomes true (a value of "1"). This latches the count of 9-bit counter 22 at the output of latch 26, causing the output of D/A converter 30 to remain constant. From an examination of FIG. 3, persons of ordinary skill in the art will appreciate that delay element 24 is interposed in the output path of counter 22 to allow the output of nonvolatile memory 32 and the output of AND gate 36 to settle prior to the new count reaching latch 26.

During this time, 9-bit counter 22 continues to count and its output sequentially addresses the contents of non-volatile memory 32. So long as the output of non-volatile memory 32 presents a "1" value to AND gate 36, the output of latch 26 remains latched. When the output of non-volatile memory 32 drops to a "0" value, AND gate 36 releases latch 26 and the current output count of 9-bit counter 22 is presented to lookup table 28, causing the output of D/A converter 30 to immediately rise (or fall) to the value of Y=sin θ for the current value of θ represented by the current output count of 9-bit counter 22.

As previously noted, there are numerous ways in which to modulate the sinusoidal carrier by temporarily freezing the input to sine lookup table 28 for a number of clock pulses whose periods together equal the desired time interval corresponding to Δθ. One advantage of employing the scheme shown in FIG. 3 using non-volatile memory 32 is that the positions of the data bits at phase angles θ$_1$, θ$_2$, θ$_2$, and θ$_4$, and the intervals Δθ can be collectively or individually adjusted simply by programming the contents of non-volatile memory 32. For, example, as previously disclosed herein, the lengths of intervals Δθ can be individually adjusted in order to cause substantially-equal ΔY changes for representing "1" value bits.

Another advantage obtained by employing non-volatile memory 32, as shown in FIG. 3, is that the bit rate of the modulation may be selectively altered. Non-volatile memory 32 is shown including higher-order-bit address inputs 38 and 40, controlled by bit-rate controller 42. This example allows addressing four separate segments of non-volatile memory 32. Each segment may be programmed with data representing different numbers of bit-encoding phase angles, different intervals for Δθ, or different combinations of both parameters.

As will be appreciated by persons of ordinary skill in the art, bit rate controller 42 may be configured to adaptively and dynamically alter the bit rate and/or the intervals for Δθ modulation in response to changing conditions within the communication channel in which the modulator of the present invention is employed. As a non-limiting example, this technique could be used to negotiate connection speed over twisted-pair telephone lines as is done in present-day dial-up modems. Similarly, this technique may be employed to alter the bit rate of the modulation technique of the present invention in any communications channel in which it is employed to for numerous purposes such as compensating for dynamically-changing conditions, such as noise, etc., in the communications channel.

As will also be appreciated by persons of ordinary skill in the art, the bit rate and/or one or more of the phase-angle positions for Δθ modulation can be switched using bit-rate controller 42 and additional address lines to access other memory locations for other purposes. Such purposes include identifying synchronization frames, identifying packet headers for use in IP or other packet protocol systems, or identifying other events or conditions. In this manner, detection of "out-of-position" bits in received carriers can be assigned meanings such as identifying events, providing additional data, swapping bit positions of entertainment content in multi-carrier systems for anti-piracy purposes, etc. These meanings may change depending on where in a "frame" this activity occurs.

The nature of bit-rate controller 42 will depend to a large extent on the nature and architecture of the system in which the modulator is disposed and on the conditions that will be used to alter the bit rate or the bit phase-angle positions. As an example, bit-rate controller 42 could be configured as a state machine, a microcontroller or a microprocessor. Configuration of the state machine and/or programming of the microcontroller or microprocessor will, of course, depend on the exact process that is being performed and is a routine task for a person of ordinary skill in the art.

As a general example, however, bit-rate controller may be conditioned to sense the presence of a condition, request, interrupt, event, or the like, and assert an address to a location in memory 32 that contains the data to produce the number of bits desired and/or set one or more bit positions at desired phase angles of the sinusoidal carrier to effect the specific response to the condition, request, interrupt, event, or the like. If additional data is being encoded, one phase-angle setting of the bit positions in the sinusoidal carrier can represent a first digital state (e.g., a "zero") and a second phase-angle setting of the bit positions in the sinusoidal carrier can represent a second digital state (e.g., a "one").

A receiver for demodulating the modulated sinewaves of the present invention may be conditioned to detect one or more "out-of-position" bits in one or more carriers and perform different actions based upon the detection and the meanings assigned to the condition. One advantage of employing this technique according to the present invention is that this may be accomplished while still utilizing the detected data, meaning that this increase in function may be obtained without degrading the bandwidth of the communications channel. For example, a carrier presenting "out-of-position" encoded bits could be used to signal that the system is about to increase or decrease the number of carriers in the channel. Persons of ordinary skill in the art will understand that the uses for this additional intelligence capability of the present invention are virtually limitless and are adaptable to the particular configuration and end use of the system in which they are employed.

The output of D/A converter 30 may be buffered, and/or mixed with outputs of D/A converters from other modulators as disclosed herein, and may be otherwise further conditioned, e.g., by further modulation or frequency conversion as necessary to prepare signals for insertion into various communication channels. This aspect of the present invention is illustrated in FIGS. 4A and 4B, to which attention is now drawn.

Figure 4A:
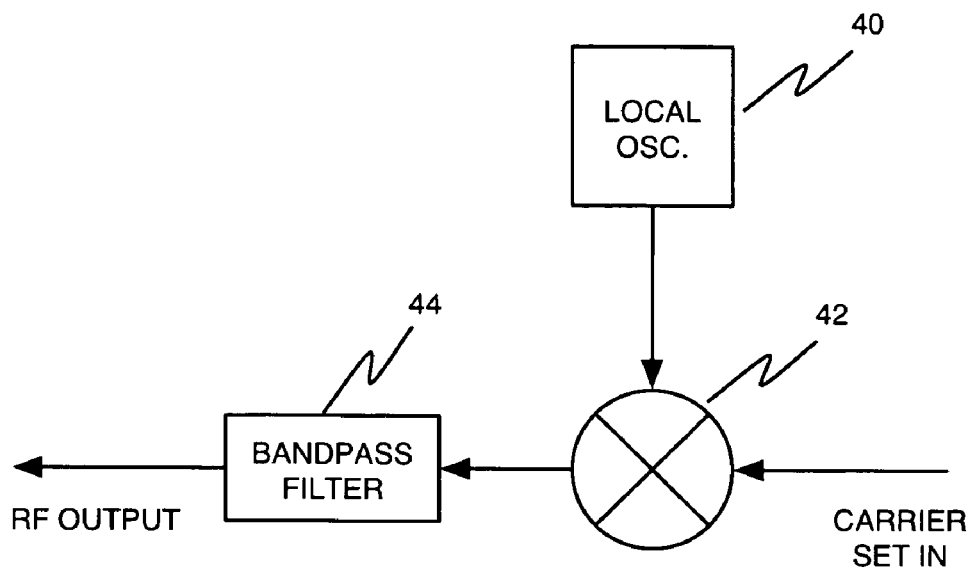
FIGS. 4A and 4B are, respectively, block diagrams of a frequency up converter and down converter that may be used in communications systems according to the present invention.

FIG. 4A is a block diagram of a frequency up converter that may be used for preparing modulated carriers for transmission in communications systems according to the present invention. Local oscillator 40 drives one input of balanced RF mixer 42. A modulated sinewave carrier set is presented to the other input of balanced RF mixer 42. The output of balanced RF mixer 42 is passed through bandpass filter 44. The arrangement of FIG. 4A for use as an upconverter is well known in the RF art.

Figure 4B:
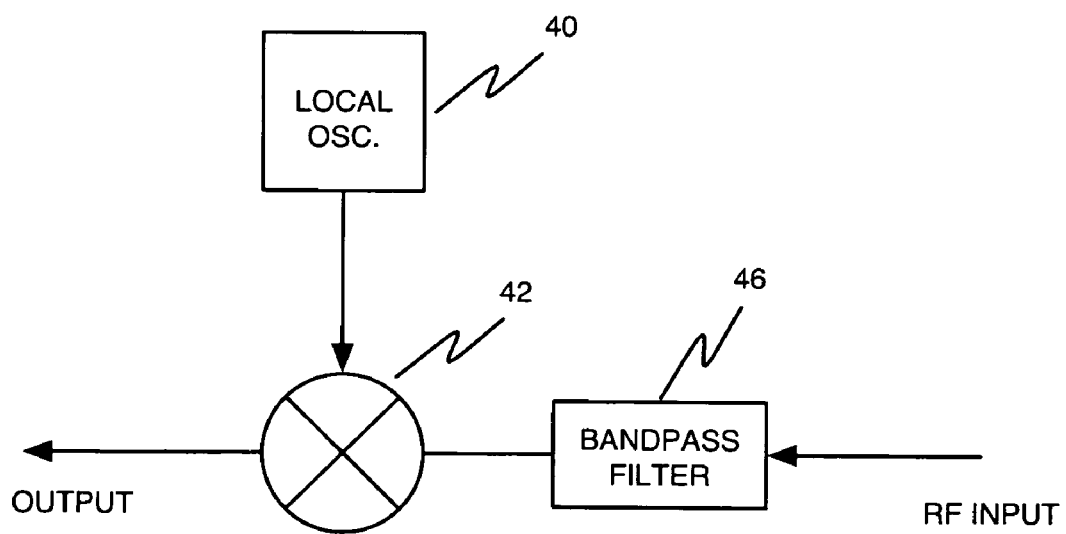

FIG. 4B is a block diagram of a frequency down converter that may be used for downconverting received modulated carrier signals in communications systems according to the present invention. As in FIG. 4A, local oscillator 40 drives one input of balanced RF mixer 42. The received RF input presented to the other input of balanced RF mixer 42 through bandpass filter 46. The output of balanced RF mixer 42 is passed to a detector of the type disclosed herein. The arrangement of FIG. 4B for use as a downconverter is also well known in the RF art.

As an example, of the use of upconverters and downconverters in the context of the present invention, carriers at frequencies in the 1 MHz range can be frequency converted to the 100 MHz range for transmission over coaxial cable communications channels, and 100 MHz range can be frequency converted to the gigahertz range for transmission over microwave-link communications channels such as terrestrial point-to-point links or satellite links. Techniques for such signal conditioning and frequency conversion are well known in the art.

Figure 5A:
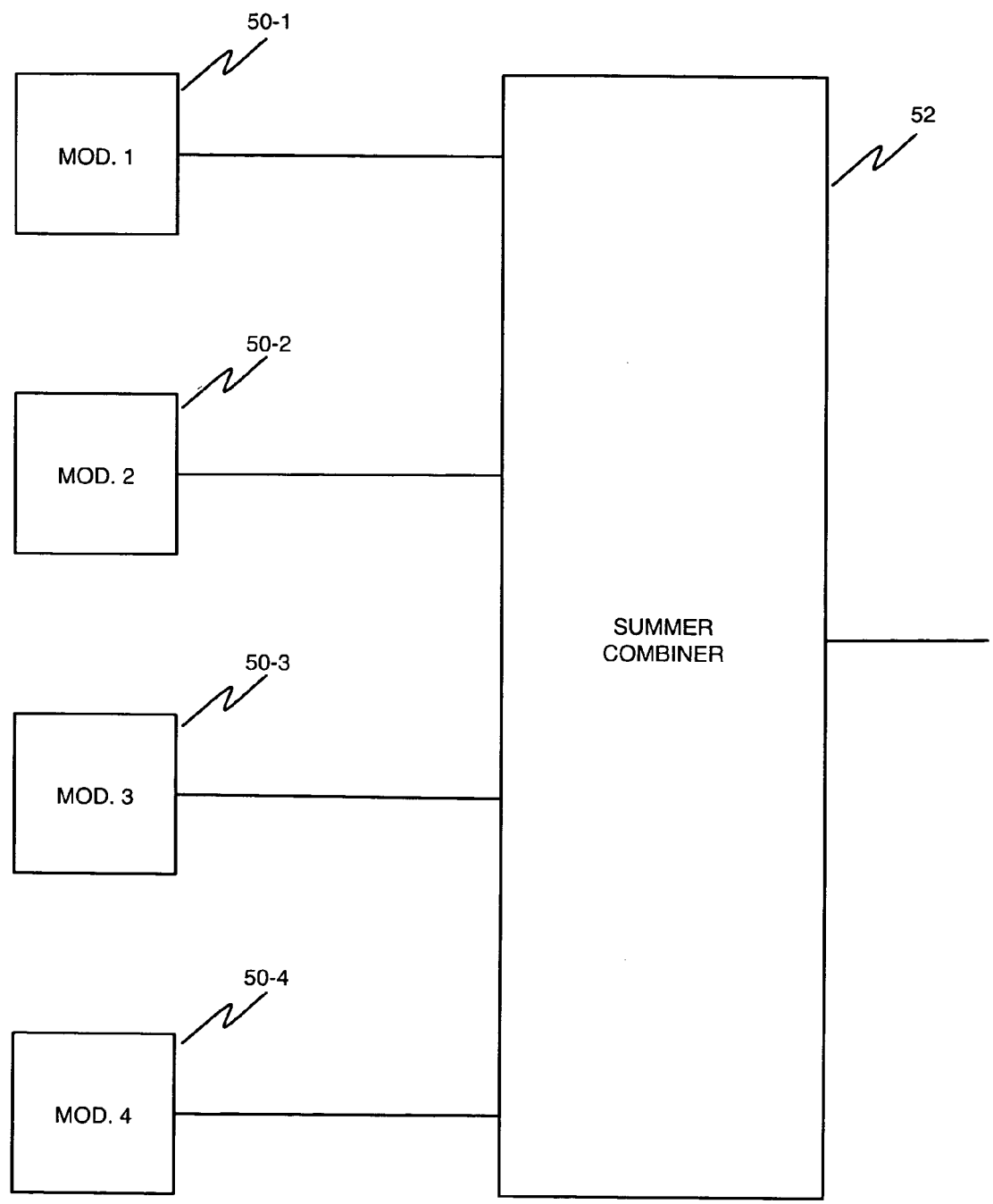
FIG. 5A is a block diagram of a plurality of illustrative modulator circuits, each for generating a modulated sinusoidal carrier, whose outputs are mixed together according to the techniques of the present invention.

Another aspect of the invention is illustrated in FIG. 5A, which is a block diagram of a plurality of illustrative modulator circuits, each for generating a modulated sinusoidal carrier, whose outputs are mixed together according to the techniques of the present invention. Modulator circuits 50-1, 50-2, 50-3, and 50-4, may all be configured as illustrated in FIG. 3 or may be otherwise configured. The modulated-sinusoidal-carrier output of each modulator is fed to mixing circuit 52. Mixing circuit 52 may be configured as simply as a summing amplifier as is known in the art or may be otherwise configured.

The output of mixing circuit 52 is a composite waveform containing all of the individual modulated sinusoidal carriers from modulator circuits 50-1, 50-2, 50-3, and 50-4. The composite waveform at the output of mixing circuit 52 may be otherwise further conditioned, e.g., by further modulation or frequency conversion as necessary to prepare signals for insertion into various communication channels. Techniques for such signal conditioning and conversion are well known in the art.

Figure 5B:
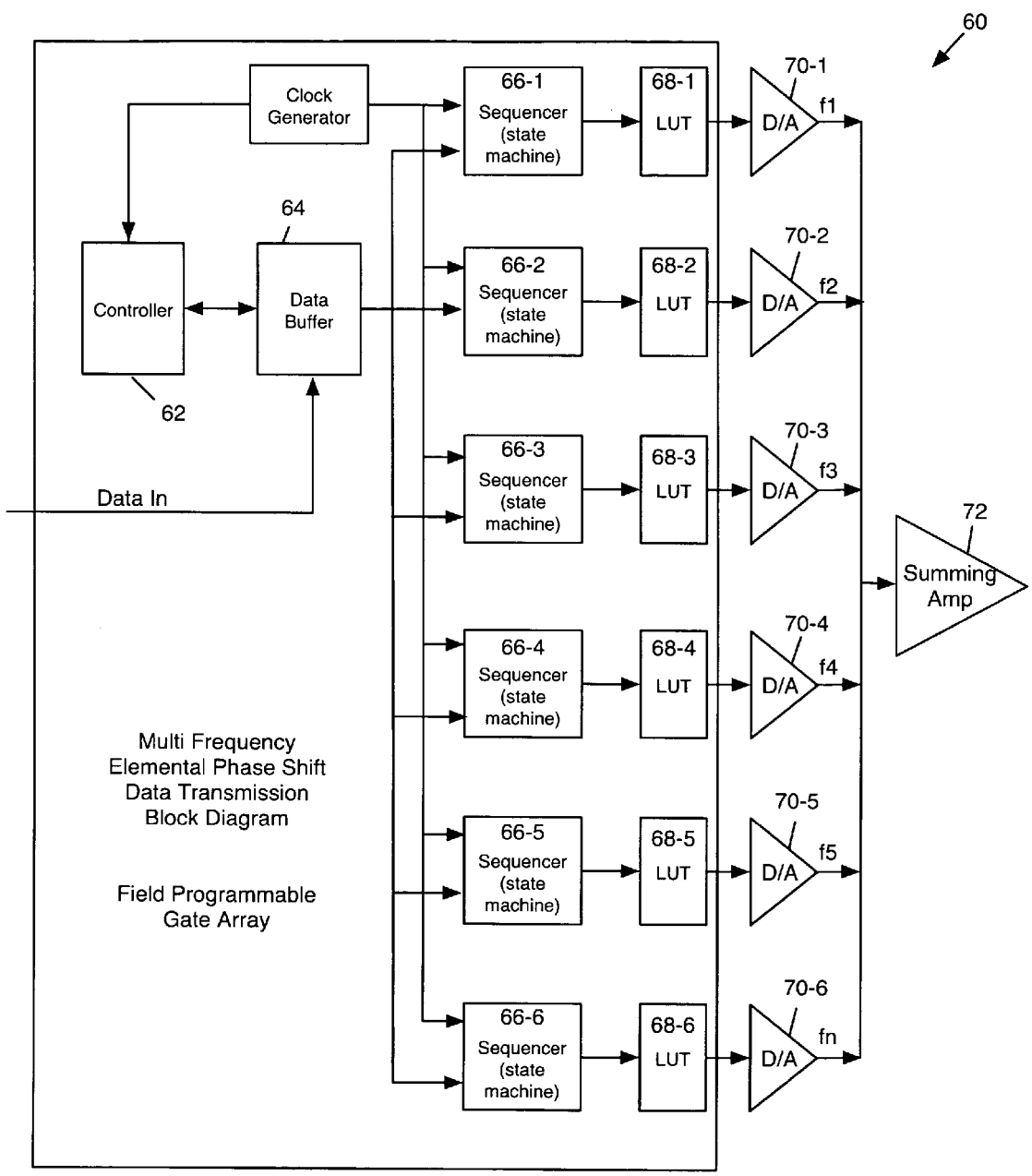
FIG. 5B is a block diagram of a system including a plurality of illustrative modulator circuits, each for generating a modulated sinusoidal carrier, whose outputs are mixed together according to the techniques of the present invention.

Referring now to FIG. 5B, a block diagram shows a system 60 including a plurality of illustrative modulator circuits, each for generating a modulated sinusoidal carrier, whose outputs are mixed together according to the techniques of the present invention. The multi-frequency elemental phase shift data transmitter described here is one of many realizations of a method to use elemental phase shifts of a carrier(s) to convey digital data.

A controller 62 provides the supervision and control of the system. Data buffer 64 stores the data that comes in from its source. The input data is clocked in from the outside source. It could be serial or parallel in format. The data buffer 64 under the supervision of the controller 62 outputs a specific data bit just at the right time for the assertion (if a one) or de-assertion (if the bit is a zero) of a elemental phase change as described above.

A plurality of sequencer state machines 66-1 through 66-6 as the name implies, are each state machines that, when clocked, sequence through the address outputs to drive a plurality of corresponding sinewave look-up tables (LUTs) 68-1 through 68-6, respectively. Persons of ordinary skill in the art will appreciate that the number of such sequencer state machines used in an actual realization of the present invention is arbitrary and six are shown only as an illustrative example. Each of the state machines 66-1 through 66-6 are used to generate the sinewave carriers according to the principles of the present invention and may be configured, for example, to perform the process disclosed with respect to FIG. 3 or an equivalent process that generates the modulated sinewave carrier of FIGS. 1A and 1B.

Sinewave LUTs 68-1 through 68-6 are fixed preprogrammed memories similar to a Read Only Memory (ROM). These memories are each programmed so that for each input address location the data register holds a specific digital value of the amplitude of a sinewave at a specific phase or angle of the wave location. In common implementations as the addresses are sequentially stimulated the data output outputs a digital representation of a sine wave. The peak amplitude is fixed and the frequency of sinewave directly corresponds to the rate the addresses are sequenced and the number of address steps that make up a complete wave.

The sequencer state machines 66-1 through 66-6 each have three inputs: clock, data and reset. The clock causes the sequencer state machines 66-1 through 66-6 to sequence through the addresses to produce a sinewave signal from the LUTs 68-1 through 68-6. When a data bit is present and at the right phase location of the sinewave the sequencer will cause its associated LUT to delay its output cause a elemental phase change in its output. The reset, when asserted, brings each sequencer state machine back to a known state.

The LUTs 68-1 through 68-6 are each essentially a fixed preprogrammed memory similar to a Read Only Memory (ROM). This memory is programmed so that for each input address location the data register holds a specific digital value of the amplitude of a sinewave at a specific phase or angle of the wave location. In common implementations as the addresses are sequentially stimulated the data output outputs a digital representation of a sine wave. The peak amplitude is fixed and the frequency of sinewave directly corresponds to the rate the addresses are sequenced and the number of address steps that make up a complete wave.

There are numerous schemes that may be employed to distribute the data from data buffer 64 to distribute the data to sequencer state machines 66-1 through 66-6. As previously noted, the data rate for each of sequencer state machines 66-1 through 66-6 will be different.

One exemplary way to distribute the data is to distribute each bit in turn to the one of sequencer state machines 66-1 through 66-6 that is going to encode the next bit. This method may be referred to herein as "streaming" and has the advantage that it requires no reassembly of the data at the receiver since the data is in the form of a simple serial data stream. This timing may be derived as a matter of simple mathematics once a system design is specified and the number and frequencies of the carriers is determined. The details of gating of the data to the appropriate one of sequencer state machines 66-1 through 66-6 from a data distributor according to a known sequence is a matter of routine digital circuit design. With reference again to FIG. 2 as an example, and assuming that 4 bits will be encoded into each half cycle of each sinewave carrier, the absolute position in time for each angular position of phase angles $\theta_1$, $\theta_2$, $\theta_2$, and $\theta_4$ can be easily calculated for each sinewave carrier in a single frame. Each of these times, and the one of the sinewave carriers with which it is associated, may be used by the controller 62 to distribute the next data bit to the appropriate one of sequencer state machines 66-1 through 66-6.

Another exemplary way to distribute the data is, for each frame, to allocate to each one of sequencer state machines 66-1 through 66-6 a block of data having a number of bits equal to the number of bits that sequencer will encode in the current frame. This information is known once a system design is specified and the number and frequencies of the carriers is determined. In the example of FIG. 2, Table 1 shows the number of bits that will be used per frame for each carrier.

| FREQUENCY | CYCLES PER FRAME | BITS PER FRAME |
|---|---|---|
| 250 Hz | 10 | 160 |
| 275 Hz | 11 | 176 |
| 300 Hz | 12 | 192 |
| 325 Hz | 13 | 208 |
| 350 Hz | 14 | 224 |
| 375 Hz | 15 | 240 |
| 400 Hz | 16 | 256 |

As will be appreciated by persons of ordinary skill in the art, depending on the complexity of the data distributing on the encoding end, this data distribution scheme might be constrained in that it may not be possible to accommodate extremely fast data rates on the receiving end because the data distributor has to wait for the data blocks of each carrier to be filled prior to the blocks being ready for release.

The outputs of the LUTs 68-1 through 68-6 are presented to D/A converters 70-1 through 70-6, respectively. The D/A converters 70-1 through 70-6 linearly and continuously convert the parallel 8-bit digital byte from the LUTs 68-1 through 68-6 to the input of the summing amplifier 72. The summing amplifier 72 is a conventional configuration of a circuit using an operational amplifier to linearly add several individual analog signals together to produce one composite signal.

A demodulation technique according to the present invention detects the modulated carrier and examines it to determine whether the sinusoidal function of the carrier has been altered at an interval $\Delta\theta$ following each phase angle $\theta_n$. For, example, if the carrier has been modulated by maintaining the amplitude Y=$\sin \theta_n$ for a short interval $\Delta\theta$ following the phase angle $\theta_n$, the modulated carrier is examined to determine if Y=$\sin \theta_n$ during the interval $\Delta\theta$ following the phase angle $\theta_n$ or whether the amplitude has been following the function Y=$\sin \theta$ during the interval $\Delta\theta$ following each phase angle $\theta_n$. Such examination may be accomplished, for example, by mixing the detected sinusoidal carrier with a reference sinusoidal signal having the same frequency and phase as the carrier to detect phase differences between the reference sinusoidal signal and the modulated carrier, or by performing fast fourier transform (FFT) analysis on the modulated carrier. Such a demodulator may also contain circuitry to detect "out-of-position" bits disposed in one or more of the carriers.

Figure 6:
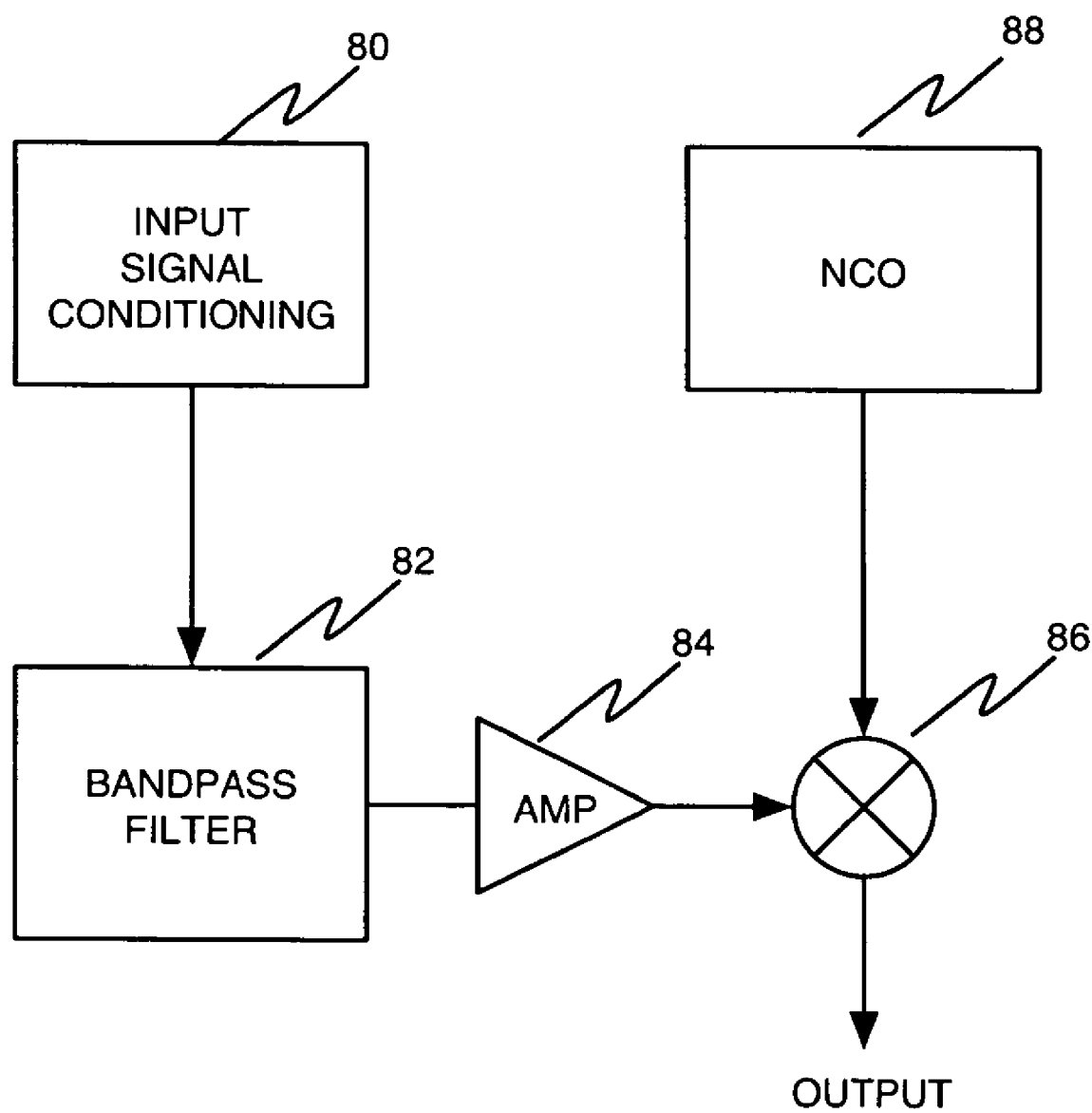
FIG. 6 is a block diagram of an illustrative demodulator circuit for extracting the information from a modulated sinusoidal carrier according to the techniques of the present invention.

FIG. 6 is a block diagram of an illustrative demodulator circuit for extracting the information from a modulated sinusoidal carrier according to the techniques of the present invention. First, the incoming modulated sinusoidal carrier is presented to signal input conditioning block 80. The nature of the circuitry inside signal input conditioning block 80 will depend upon the transmission medium used in the communication channel. For example, if the transmission medium is a twisted pair cable such as would be encountered in a telephone network, signal input conditioning block 80 may be formed from a differential line receiver. If the transmission medium is a radio or microwave transmitter, as may be encountered in a wireless or satellite communications system, the signal input conditioning block 80 may consist of the usual RF and IF front end circuitry, including antennas, RF amplifiers, down converters, and RF detectors if applicable to the RF system used.

The output of signal input conditioning block 80 is presented to narrow bandpass filter 82. Narrow bandpass filter 82 should have a Q of about at least 100. The center frequency of narrow bandpass filter 82 is selected to be the frequency of the modulated sinusoidal carrier. The signal from the narrow bandpass filter 82 is amplified in amplifier 84 and presented to one side of double-balanced mixer 86. The other side of double-balanced mixer 86 is fed by the output of numerically-controlled oscillator (NCO) 88. The frequency and phase of NCO 88 is set to the frequency and phase of the one of the modulated sine waves within the passband of bandpass filter 82.

Figure 7:
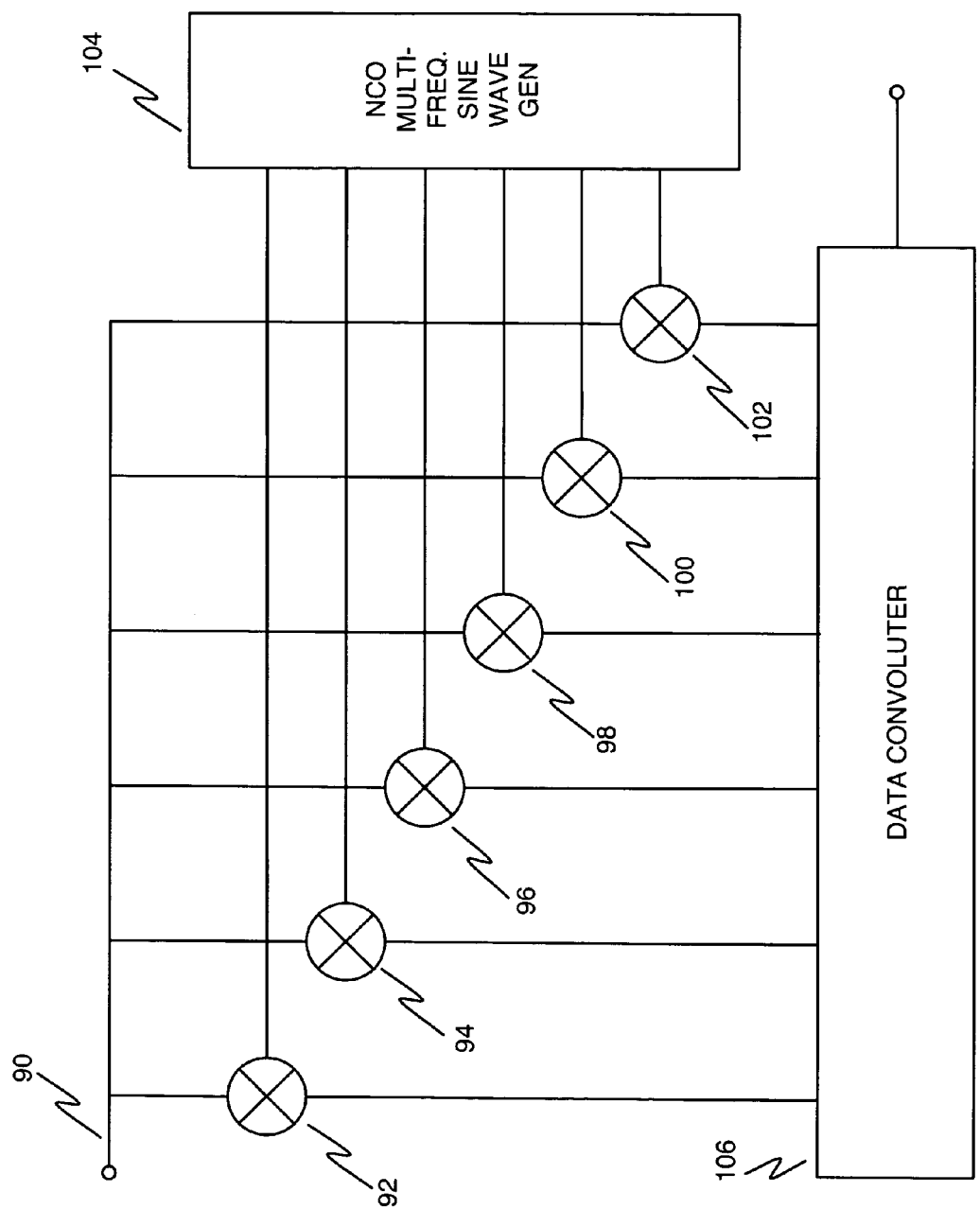
FIG. 7 is a block diagram of a plurality of illustrative demodulator circuits, each for demodulating a modulated sinusoidal carrier, whose outputs are combined into an output data stream according to the techniques of the present invention.

In a communications system according to the present invention that employs a plurality of modulated carriers within a communications channel, provision is made for separately demodulating each of the carriers to extract the encoded data. Referring now to FIG. 7, a block diagram shows an input line 90 driving a plurality of a plurality of illustrative balanced mixers 92, 94, 96, 98, 100, and 102. Six balanced mixers are shown in FIG. 7, but persons of ordinary skill in the art will readily understand that any number of balanced mixers could be used depending on how many different-frequency modulated sinewaves were generated by the modulator circuitry of FIG. 5A.

Balanced mixers 92, 94, 96, 98, 100, and 102 are also driven from the outputs of NCO multi-sine wave generator 104. Each output is a sine waveform at one of the frequencies of the sinewave-modulated carriers from which the digitally encoded information is to be extracted. The outputs of balanced mixers 92, 94, 96, 98, 100, and 102 are combined into a serial or parallel output data stream in data convoluter 106 according to known techniques.

Data convoluter 106 reassembles the digital data from the individual modulated sinewaves. Because the individual modulated sinewaves are at different frequencies, the n bits of data from each are arriving at different rates. For example, in a system using telephone-line bandwidth below 3 KHz, the carrier frequencies might be 1 KHz, 1.2 KHz, 1.4 KHz . . . 3 KHz. The data in the 1 Khz carrier is arriving at a rate of n bits per 1 mSec. The data in the 3 Khz carrier is arriving at three times that rate. Reassembly of the data from the different carriers is not much different from reassembling packet data in an IP packet network. Various known techniques can be employed. Persons of ordinary skill in the art will understand that the details of the reassembly process will vary as a function of the manner in which the data was divided among the several carriers in a multi-carrier system.

According to one aspect of the invention, one carrier could be employed to carry control information necessary for one or more aspects of the communication, or a combination of control information and data. Depending on the amount of control information required in a communications channel, the control information may be encoded in the carrier having the lowest data rate (i.e., 1 KHz carrier in the example above), the highest data rate (i.e., 3 KHz carrier in the example above), or in one of the other carriers.

Figure 8:
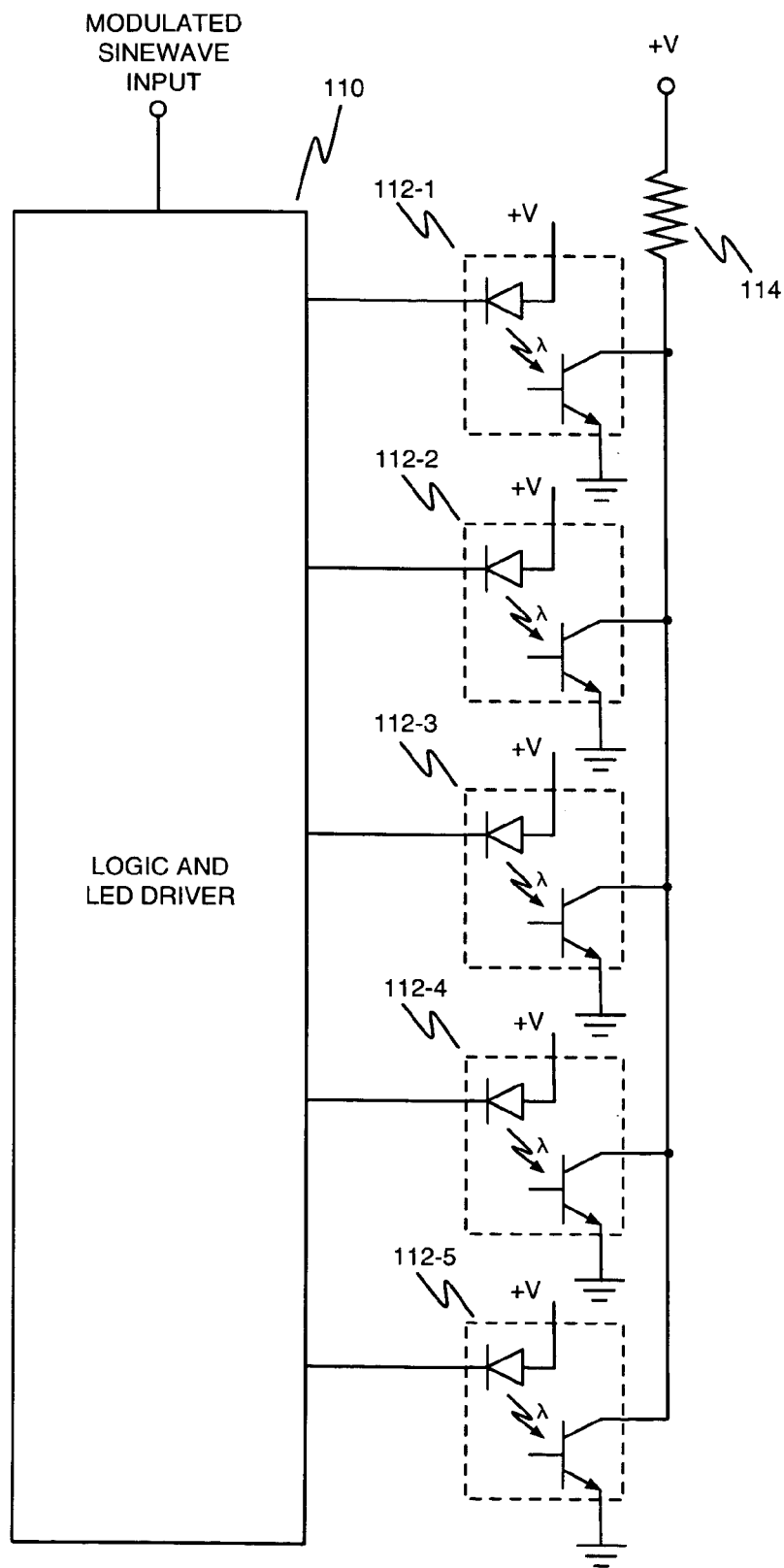
FIG. 8 is a block diagram of an optical demodulator circuit that may be used in accordance with the present invention.

Referring now to FIG. 8, an alternate circuit and method for demodulating a sinusoidal carrier modulated according to the principles of the present invention is shown. This demodulator operates by driving a moving dot LED display, where the illuminated dot represents the level of the received modulated sinewave. Because the voltage of the unmodulated portions of the sinewave carrier and portions of the carrier modulated with a zero bit (such as shown at phase angle $\theta_4$ of FIG. 1A), changes fairly rapidly while the voltage level at portions of the carrier modulated with a one bit (such as shown at phase angle $\theta_4$ of FIG. 1A) stays constant for a longer period, the LED corresponding to the voltage level starting at phase angle $\theta_4$ of FIG. 1A will be brighter for a longer time. This difference in brightness is sensed and decoded.

The demodulator circuit of FIG. 8 inputs one of the modulated sinewaves to a logic and LED driver circuit 110. In one embodiment of the invention logic and LED driver circuit 110 may be a dot bar display integrated circuit such as a LM 3914 integrated circuit available from National Semiconductor Corporation of Santa Clara, Calif. The LM3914 is a monolithic integrated circuit that senses analog voltage levels and has outputs for driving a plurality of LEDs, thus providing a linear analog display. The display can be configured as a moving dot display. The outputs of logic and LED driver circuit 110 are shown driving five optoisolator circuits 112-1 through 112-5. Each opto-isolator circuit contains a LED optically coupled to a phototransistor. The LED has its anode coupled to a positive potential and its cathode coupled to one of the outputs of the logic and LED driver circuit 110. The emitters of the phototransistors are shown grounded in FIG. 8 and the collectors are coupled together and coupled to a positive voltage potential through resistor 114, although persons of ordinary skill in the art will appreciate that other circuit configurations could be employed.

The difference between a "zero" bit and a "one" bit is a lower voltage at the bottom of resistor 114 for a "one" bit due to the higher current drawn by the one of the phototransistors that is conducting. The timing of the voltage level to determine which bit is being sensed is easily derived from the available voltage, phase, and frame information available in the particular system.

Persons of ordinary skill in the art will appreciate that the configuration of FIG. 8 will operate over a wide frequency range and that care should be taken in selecting components for such a circuit intended for use at higher frequencies to ensure that their response times are adequate for the frequency of intended use.

One communications system according to the present invention employs a modulator to insert at least one modulated carrier according to the present invention onto one end of a telephone line or other wire-pair communications line. Preferably, a plurality of such modulated carriers, separated in frequency by a guard-band amount, are injected into the line. A demodulator is coupled to the other end of the telephone line or other wire-pair communications line. According to one embodiment of the invention, a modulator and the demodulator may be located at each end of the line and the communications may be-two-way communications.

According to another embodiment of the invention, the modulator and the demodulator may negotiate a bit rate to be used in the communications.

Figure 9:
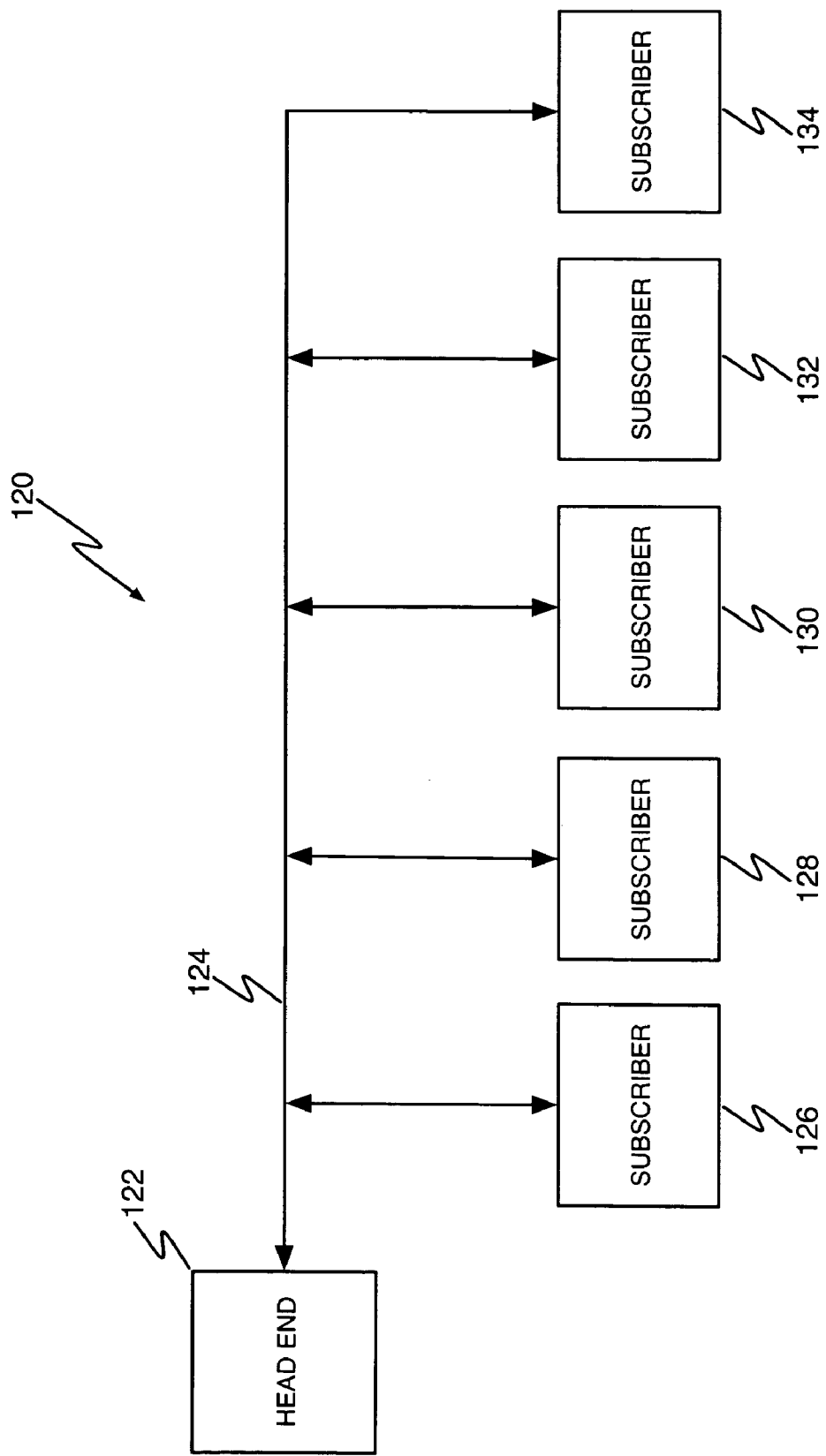
FIG. 9 is a high-level block diagram illustrating a cable-modem data communications system utilizing modulated sinewave carriers according to the present invention.

Referring now to FIG. 9, a high-level block diagram shows an illustrative cable-modem data communications system 120 utilizing modulated sinewave carriers according to the present invention. Communications system 120 includes a "head end" 122 that is normally configured to transmit CATV signals over a coaxial cable 124 as is known in the art. Head end 122 is adapted for use in the present invention in that it includes circuitry necessary to modulate and demodulate digital information passing between the head end and a plurality of subscribers according to the present invention.

A plurality of subscriber receivers 126, 128, 130, 132, and 134 are coupled to coaxial cable 124 as is also known in the art. The mechanical and electrical details of coaxial-cable distribution systems are well known to persons of ordinary skill in the art and will not be discussed herein in order to avoid obscuring the disclosure of the invention.

Each subscriber receiver 126, 128, 130, 132, and 134 will include a cable modem that is used to modulate and demodulate the sinewave carriers used to carry digital information between each subscriber and the head end according to the present invention.

Figure 10:
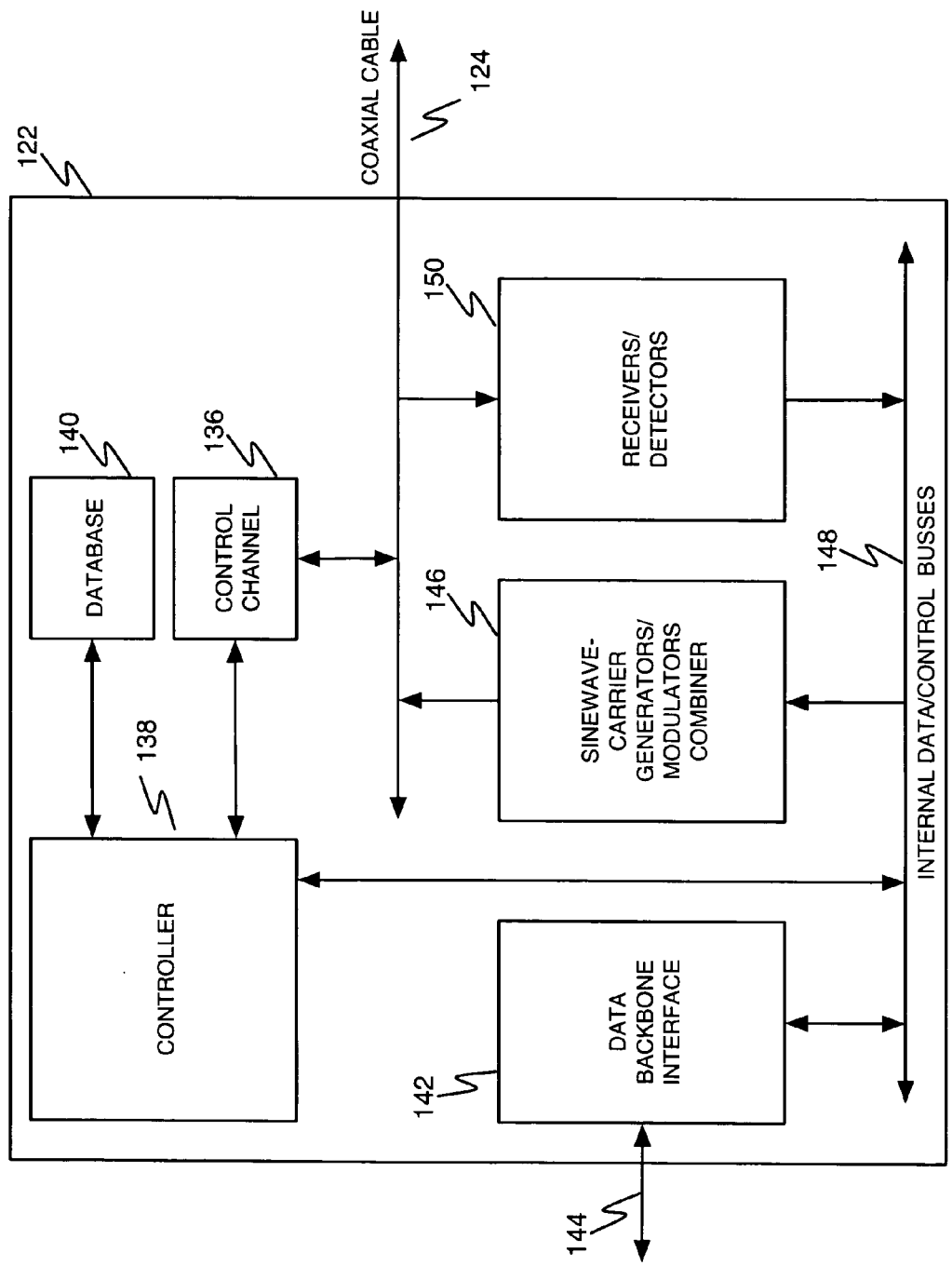
FIG. 10 is a block diagram illustrating communications system for a coaxial-cable communications line according to the present invention employing a modulator to insert at least one modulated carrier according to the present invention onto each end of the coaxial-cable communications line and a demodulator coupled to each end of the coaxial cable communications line.

FIG. 10 is a high-level block diagram of the portion of an illustrative head end 122 that may be employed in a cable-modem data communications system utilizing modulated sinewave carriers according to the present invention. The conventional portion of head end 122 that is used to transmit CATV signals to subscribers is not shown in FIG. 10.

Coaxial cable 124 is coupled to a control channel 136 that includes at least on sinewave modulator and demodulator pair according to the present invention. This at least on sinewave modulator and demodulator pair is employed as a control channel for use to establish two-way communication between head end 122 and any of the subscriber cable modems that are coupled to coaxial cable 124. Conventional frequency conversion techniques may then be used to upconvert the modulated sinewaves in the control channel to occupy a space in the frequency domain within the CATV bandwidth.

The communications system 120 uses control channel 136 to initiate sessions with existing subscribers, change levels of service and add or subtract system features to existing subscriber accounts. Control channel 136 may also be used to register new subscribers to the system, and to perform housekeeping tasks related to the various subscribers of the system, such as assigning particular sinewave carriers to individual subscribers on a session basis or on a more permanent basis. Control channel 136 may also be used to manage downloading content to individual subscribers, such as pay-per-view entertainment programs and other content.

Control channel 136 interfaces with controller 138. Controller 138 may be a microcontroller or microprocessor and manages the interaction of control channel 136 and a database 140. Database 140 is used to store subscriber account information. Such information may include, but is not limited to, identity, address, and billing information, level-of-service information, service-feature information, etc.

In addition, database 140 includes a number of tables. An assigned frequency table keeps track of the system frequencies that have been assigned an d the ones that remain unassigned. This table is consulted and used to avoid the possibility of conflicts by preventing the assignment of the same frequency to be used by two different user cable modems.

A frequency-in-use table may be employed to maintain a list of transmit and receive frequencies that are currently in use in sessions between the head end and the various user cable modems. This table may also be consulted and used to avoid the possibility of conflicts by preventing the assignment of the same frequency to be used by two different user cable modems. In addition, this table can be used, for example, during period of high usage, to assign currently-unused transmit and receive frequencies to the pool of available frequencies to provide additional bandwidth.

Controller 138 also interfaces with data backbone interface 142. As is known in the art, data backbone interface 142 is coupled to a high-bandwidth channel 144 for communication across a network such as the Internet, a private network or an intranet. Data backbone interface 142 is configured to act as a conventional backbone interface as is known in the art.

Sinewave carrier generators, modulators and combiners 146 of the type disclosed herein are coupled to the data backbone interface 142 via an internal data and control bus 148. The sinewave carrier generators, modulators and combiners 146 take data destined for the subscribers and prepare, sinewave modulate, channelize, and transmit the data to the subscribers in the manner disclosed herein. As disclosed herein, sinewave carrier generators, modulators and combiners 146 are preferably configured to generate and modulate a plurality of sinewave carriers, although embodiments are contemplated in which single modulated sinewave carriers are employed.

Receivers and detectors 150 are also coupled to the internal data and control bus 148. Receivers and detectors 150 receive and demodulate the sinewave-modulated carrier data transmitted from the subscribers and pass it on to the high-bandwidth channel through the data backbone interface 142. As with the sinewave carrier generators, modulators and combiners 146, receivers and detectors 150 are preferably configured to generate and modulate a plurality of sinewave carriers, although embodiments are contemplated in which single modulated sinewave carriers are employed.

Figure 11:
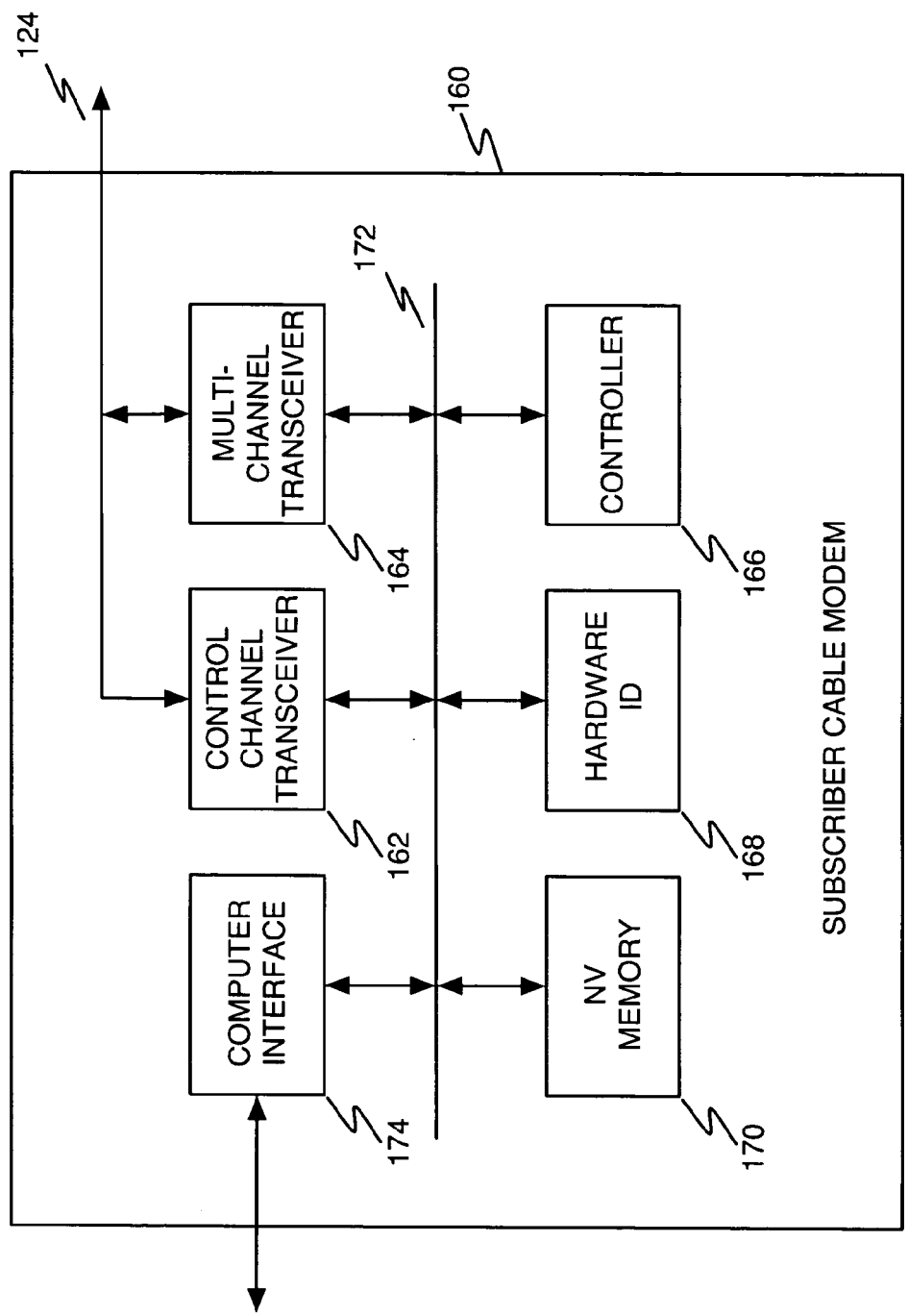
FIG. 11 is a block diagram illustrating a head end of a communications system of the kind shown in FIG. 10.

Referring now to FIG. 11, a block diagram shows an illustrative subscriber cable modem 160 according to the present invention. Cable modem 160 includes a control channel transceiver 162 and a multi-channel transceiver 164, coupled to coaxial cable 124. Control channel transceiver 162 modulates, transmits and receives control channel data to and from the head end 122 as described herein, and multi-channel transceiver 164 modulates, transmits and receives user data to and from the head end 122.

Each subscriber cable modem 160 includes a controller 166 that controls its operation. Controller 166 may be a microcontroller or microprocessor and is coupled to the control channel transceiver 162 and the multi-channel transceiver 164, as well as to a hardware ID unit 168 and non-volatile memory 170 via an internal data and control bus 172. Hardware ID unit 168 may be a read-only-memory and contains data uniquely defining the individual subscriber cable modem 160. Non-volatile memory 170 is used to store information downloaded from the head end enabling various features of the cable modem communication system and/or storing a list of transmit and receive frequencies for either or both of control channel and the data channels.

The components of subscriber cable modem 160 including control channel transceiver 162, multi-channel transceiver 164, controller 166, hardware ID unit 168, and non-volatile memory 170 communicate with one another along a data/control bus 172. Computer interface 174 is also coupled to data/control bus 172 and provides an interface such as USB, firewire, 10- or 100-base-T or other well known computer interface over which to transfer data to and from user cable modem 160 to a user computer (not shown).

Figure 12:
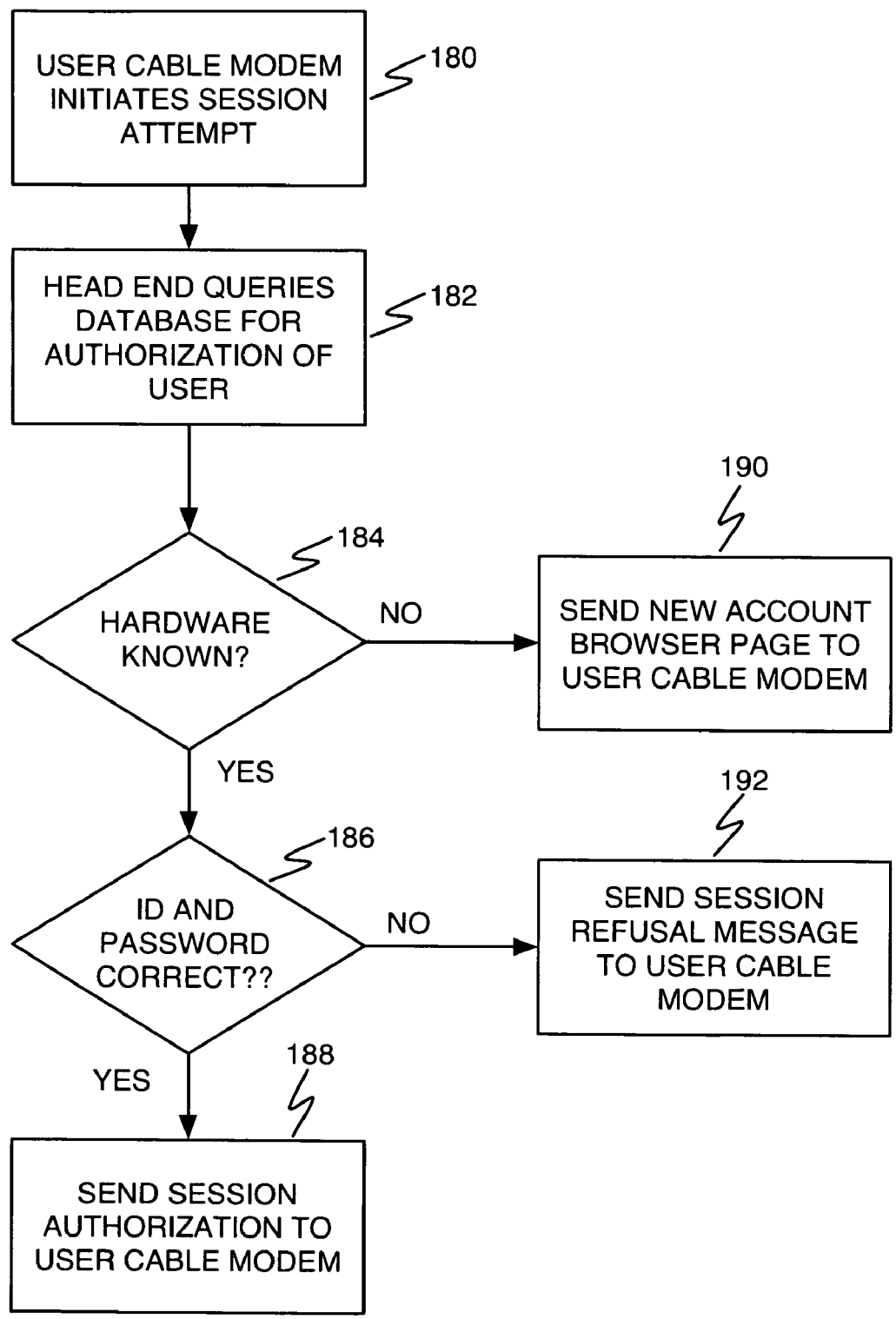
FIG. 12 is a flow diagram illustrating a user cable modem that may be used in a communications system of the kind shown in FIG. 10.

The operation of the communications system described with reference to FIGS. 9 through 11 is illustrated in the flow diagrams of FIGS. 12 through 16. Referring first to FIG. 12, a session initiation routine is shown from the perspective of both the head end 122 and the subscriber cable modem 160.

First, at reference numeral 180, the subscriber cable modem 160 attempts to initiate a session by sending a message to head end 122 via the control channel. The message is assembled by the controller 166, modulated into a sinewave carrier at the control channel frequency, and then and sent to the head end 122 via the control channel transceiver 162 and includes the user ID and password and also includes the data contained in hardware ID unit 168 uniquely defining the individual subscriber cable modem 160.

Next, at reference numeral 182, the head end receives the modulated sinewave carrier on the control channel frequency, demodulates it and examines the data it contains. Head end 122 queries database 140 for entries corresponding to the hardware and user information sent by the cable modem.

At reference numeral 184, the hardware ID data is compared with entries in the database 140 to determine whether the hardware ID information identifies a cable modem 160 that is known to the system. If the cable modem is known to the system, the received user ID and password are compared against the user ID and password information stored in the database 140 at reference numeral 186. If the received user ID and password are verified, the user is authenticated and the session is initiated at reference numeral 188.

In the event that the database 140 at the head end 122 does not contain an entry for the hardware ID unit 168, the head end knows that user cable modem 160 is unknown to the system. The session is refused as shown at reference numeral 190. The head end 122 may send data to the subscriber cable modem 160 that directs a browser application in the user computer to a registration window in which the user can register the cable modem with the communications system by prompting the new user to enter into windows in the browser page data corresponding to such information as user name, user password, credit-card and/or other billing information, quality-of-service, and/or other features desired for the new account being established. The design of HTML-based browser data-entry pages having features as described herein is well known in the art and will not be described further herein.

If, at reference numeral 186, incorrect ID or password information was received, the head end 122 sends a session-refusal message to the user cable modem 160 at reference numeral 192.

According to another aspect of the present invention, a subscriber cable modem 160 connected to the head end 122 for the first time may be programmed to enter a sign-up mode that automatically directs a user's computer attached to the user cable modem 160 to a web-based sign-up page of the type described above. Upon verification of the new account, the head end sends a message to the subscriber's cable modem 160 disabling the sign-up mode and enabling the normal operating mode for session initiation. The user cable modem 160 can also include a reset feature that places the user cable modem 160 back into sign-up mode in the event that the unit is sold to a new user or the existing user migrates to a new service provider.

Figure 13:
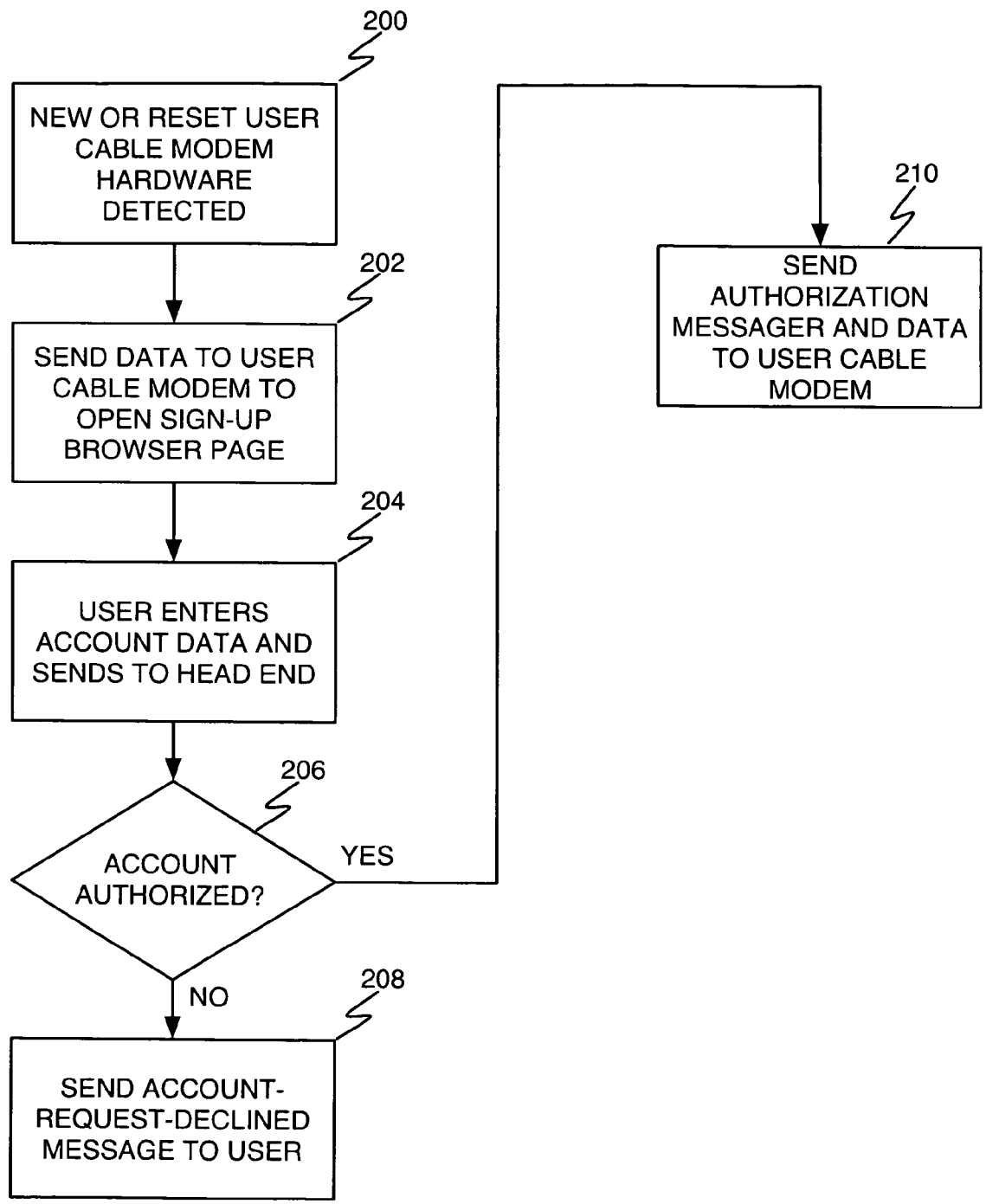
FIG. 13 is a flow diagram of an illustrative process according to the present invention for establishing a user account in a cable modem system according to the present invention.

Referring now to FIG. 13, a flow diagram shows an illustrative account-establishment method is illustrated using. First, at reference numeral 200, the head end 122 determines either that the data in the hardware ID unit 168 is not known to the head end database 140 or that the subscriber cable modem is in sign-up mode, either because it is new and unused or has been otherwise placed into reset mode. Next, in response at reference numeral 202, the head end 122 sends data to the subscriber cable modem to direct the computer connected to the user cable modem 160 to open a browser window prompting the user to establish an account with the cable provider maintaining the head end 122.

At reference numeral 204, the new user then fills the requested information into the browser window and sends it to the head end 122. At reference numeral 206 the head end 122 verifies the user information to determine whether an account should be established according to the provider's criteria. If not, the head end 122 sends data that may be displayed as an HTML message in a window of the user's browser application denying the account request at reference numeral 208.

If the verification process is successful, at reference numeral 210, the head end sends an authentication message to the user cable modem 160 including information to store in the non-volatile memory 170 that can either be used to enable at least the currently-requested session or may be sent by the user in response to a prompt sent to the user to initiate a new sign-in attempt. Such information may include a welcome message to be displayed on the computer of the new user. Such information may also include data identifying specific carrier-frequency assignments and identification of enabled features for the communications between the new user's cable modem 160 and the head end 122 to be stored in the non-volatile memory in the user's cable modem 160. The information may alternately include data to be stored in the user's cable modem 160 specifying the authorized service level and/or optional features, which data is sent to the head end in response to each session-start request.

In the alternative, a successful new-user registration may cause the account-parameter definition information to be stored in the database 140 in the head end 122 to be accessed each time the user attempts to initiate a session. The session request in this embodiment causes the head end to access the database 140 and the data returned by the database establishes the session parameters, which are then sent to the user's cable modem 160 to define the session parameters.

Figure 14:
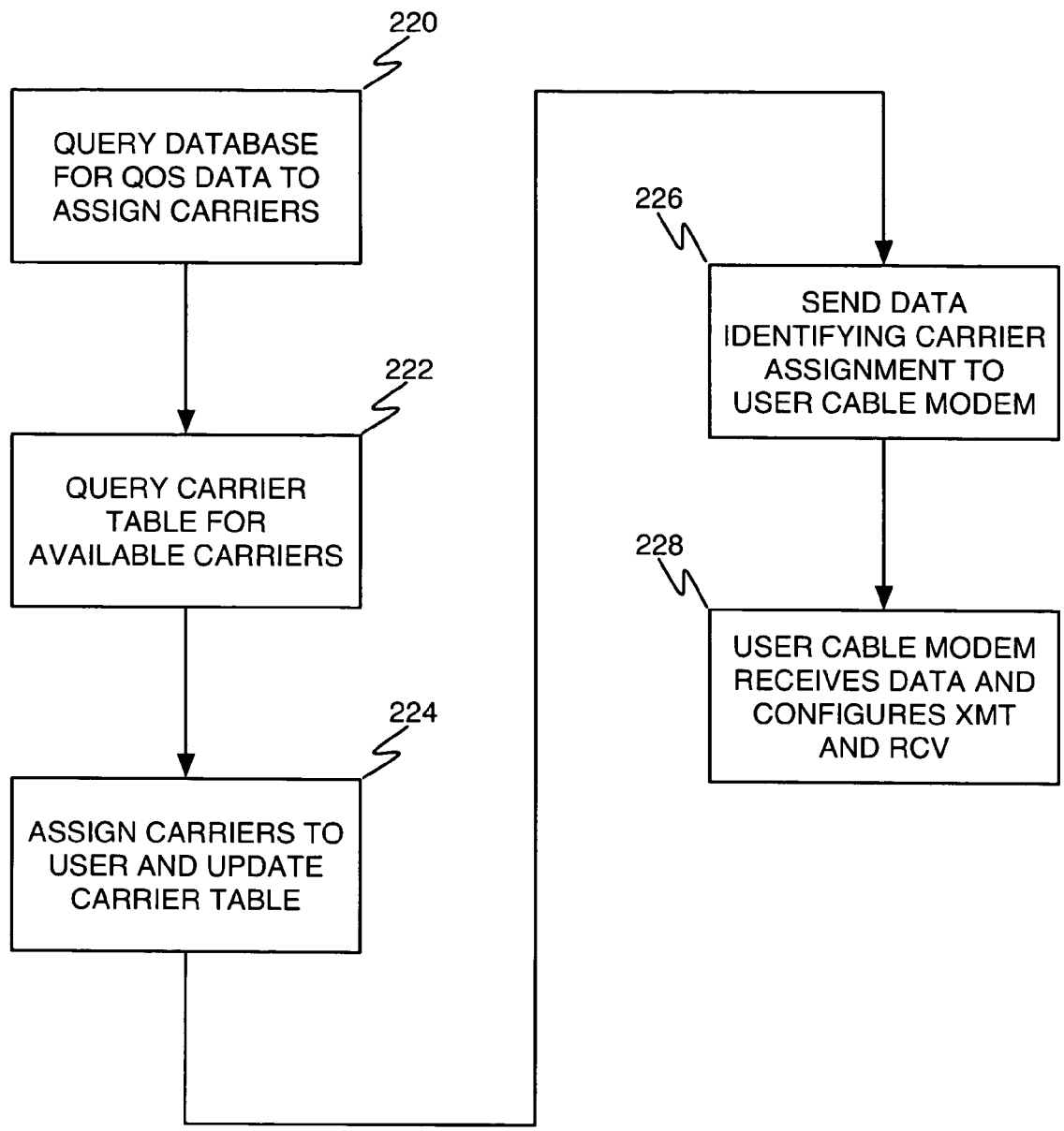
FIG. 14 is a flow diagram of an illustrative process according to the present invention for assigning carriers to a user cable modem.

Referring now to FIG. 14, a flow chart illustrates an exemplary method for establishing communications parameters in an illustrative system according to the present invention once the head end 122 verifies that the user is authorized and that a session should be initiated. First, at reference numeral 220, the head end 122 queries its database 140 to determine the quality-of-service to which the user has subscribed and the requisite number of carriers that must be assigned to that user to provide that level of service. With the system of the present invention, upload and download bandwidths may be independently assigned to the user by specifying different numbers of carriers for uploading and downloading between the head end and the user. The database may also contain other relevant information, such as optional features to which the user has subscribed.

Next, at reference numeral 222, the head end 122 queries its database 140 to determine which carrier frequencies are unused, and are thus available for assignment to the user. At reference numeral 224, the head end 122 assigns those carrier frequencies to the user and updates the carrier frequency table to indicate that those frequencies have been assigned to the user for the current session.

At reference numeral 226, the head end sends data identifying the assigned carrier frequencies to the user cable modem 160 across the control channel. Next, at reference numeral 228, the user cable modem 160 receives the data and uses it to configure the appropriate number of carrier generators and receivers to handle the communications session.

In another embodiment of the present invention, the carrier frequencies used for communication between the head end 122 and the user cable modem 160 may preassigned by the head end 122 when the user's account is established. Data identifying these carrier frequencies are sent to the user cable modem 160 via the control channel 136 when the account is established. In order to maintain the flexibility of the system, however, the head end 122 has the capability of dynamically reassigning these carrier frequencies among users even during sessions by reassigning them over the control channel frequencies.

Figure 15:
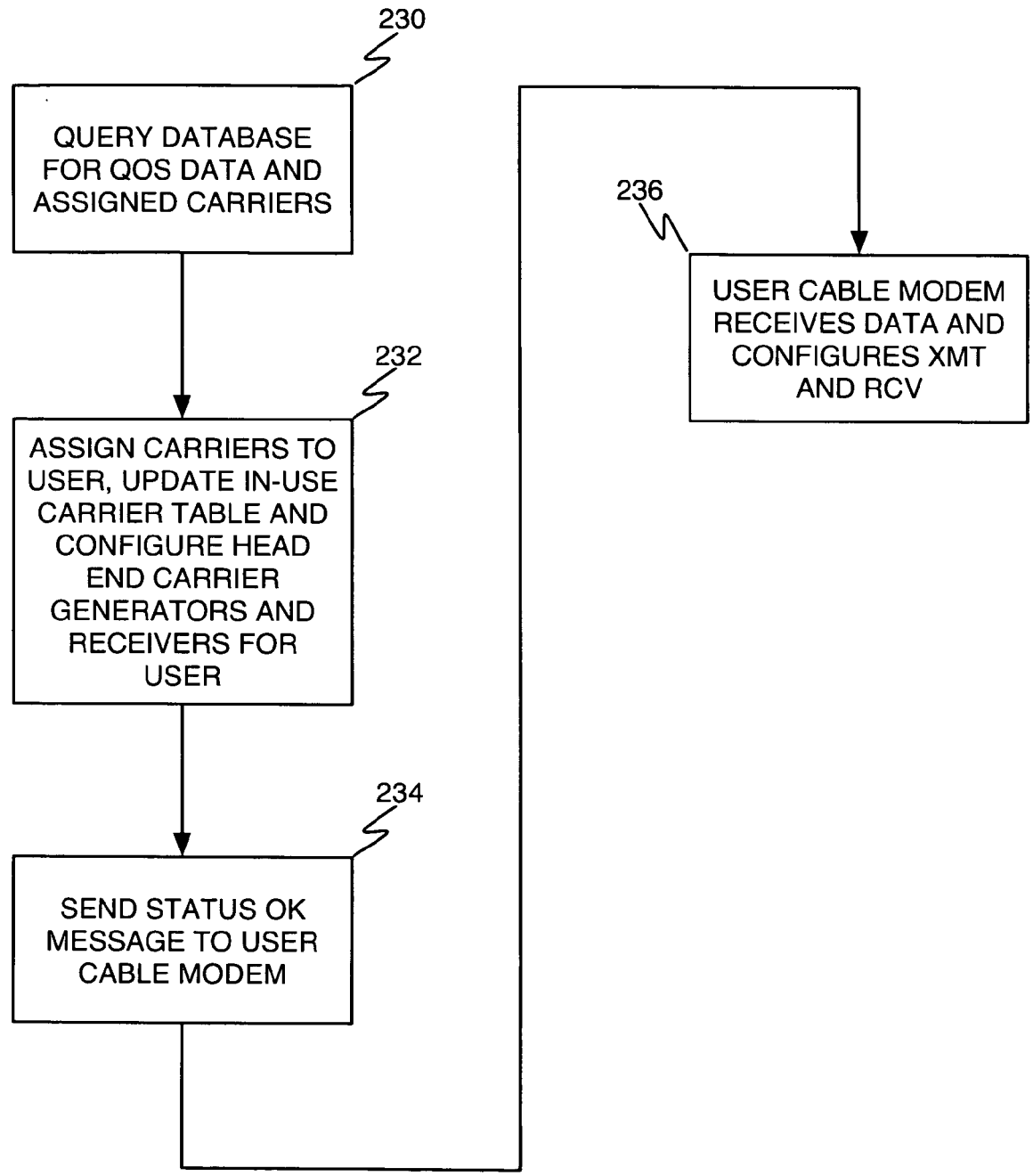
FIG. 15 is a flow diagram of another illustrative process according to the present invention for assigning carriers to a user cable modem.

In order for the system to function smoothly, a process like the one illustrated with respect to FIG. 15 may be implemented to initiate sessions between a user cable modem and the head end. First, at reference numeral 230, the head end 122 detects a session request, either over the control channel 136 or over one of the transmit carrier frequencies known to be associated with a particular user. After verifying the user ID, password, and account status, the head end 122 queries the database for the quality-of-service information and identification of the carriers currently assigned to the user to provide that quality-of-service associated with the user.

Because the user can change the quality-of-service level and also can add or delete system features, having the head end access this information in the database 140 at the start of each session assures that the head end 122 assigns appropriate resources on the appropriate carriers to the user at the commencement of each session. In addition, if the head end 122 has reallocated the carrier frequencies of the users, it will have notified the users over the control channel and the user cable modems will now have stored the new frequency-allocation information. By accessing this information at the start of each session, it is assured that the head end 122 and the individual user cable modems are listening for each other at the correct carrier frequencies.

Next, at reference numeral 232, the head end 122 assigns from its database the correct carrier frequencies for the communication with the user cable modem 160 to an appropriate number of its transmitters and receivers and updates its table of carriers in use.

Next, at reference numeral 234, the head end 122 sends a status OK message to the user cable modem 160 requesting the session to indicate that the transmit and receiver carrier frequencies are coordinated between the head end 122 and the user cable modem 160. Persons of ordinary skill in the art will recognize that this process could at this point send the carrier frequency information stored in its database to the user cable modem 160 to assure that the communications frequencies are coordinated between the head end 122 and the user cable modem 160.

Next, at reference numeral 236, the user cable modem 160 receives the Status OK message from the head end 122 and configures the appropriate ones of its transmitters and receivers to effect communications with the head end 122. In one variation, the user cable modem 160 uses frequencies it had previously received from head end 122 and stored locally. According to another variation, the user cable modem 160 uses frequencies it has received from head end 122 with the status OK message.

According to the present invention, the user cable modem 160 can be enabled to communicate with the head end 122 in one of several ways. According to one exemplary method, the communication for the session is enabled using one or more predetermined sinewave carrier-frequency pairs that had been downloaded from the head end 122 to the non-volatile memory 170 in the user cable modem 160 at the time that the user was registered with the system. In such an embodiment, the database 140 maintains a carrier allocation table for the user base. According to this embodiment, the head end 122 may use its knowledge of the association of users with particular carrier frequencies in the carrier allocation table as a part of the session authentication process.

According to another exemplary method within the scope of the present invention, the session communication frequencies are downloaded to the user cable modem 160 from the head end 122 using an available-frequency carrier allocation table at the time that the individual user session is initiated. Carrier frequencies may thus be dynamically allocated as user sessions begin and end.

Persons of ordinary skill in the art will appreciate that other static and dynamic methods can be used to select the user-data communication carriers according to the present invention. Other data stored in the non-volatile memory 170 or downloaded from the head end 122 at the time the session is enabled following user authentication can be employed to select the communication carrier frequencies.

Such other data can include quality-of-service considerations that may be stored in the database. For example, a user account could be established having a specified preset minimum upload and/or download bandwidth. Upon session initialization, the non-volatile memory contents could specify, or the head end 122 could enable by downloading the definitions of, the number of transmit sinewave carriers and receive sinewave carriers needed to provide the user with the subscribed-to upload and download bandwidths.

Persons of ordinary skill in the art will recognize that the flexibility of the cable-modem communications system of the present invention will allow dynamic carrier frequency allocation in the event of noise or other interference. For example, controller 138 or other intelligence, for example associated with the receivers/detectors 150 in the head end 122 can monitor dropped packet reports or other error criteria returned by the user cable modems 160 over the control channel or the data channel such as CRC errors and, if the error level is unacceptable, can reallocate carrier frequencies by communicating over the control channel with one or more of the individual user cable modems 160 experiencing data problems, sending control information defining the new carrier frequencies to the individual user cable modems 160.

Figure 16:
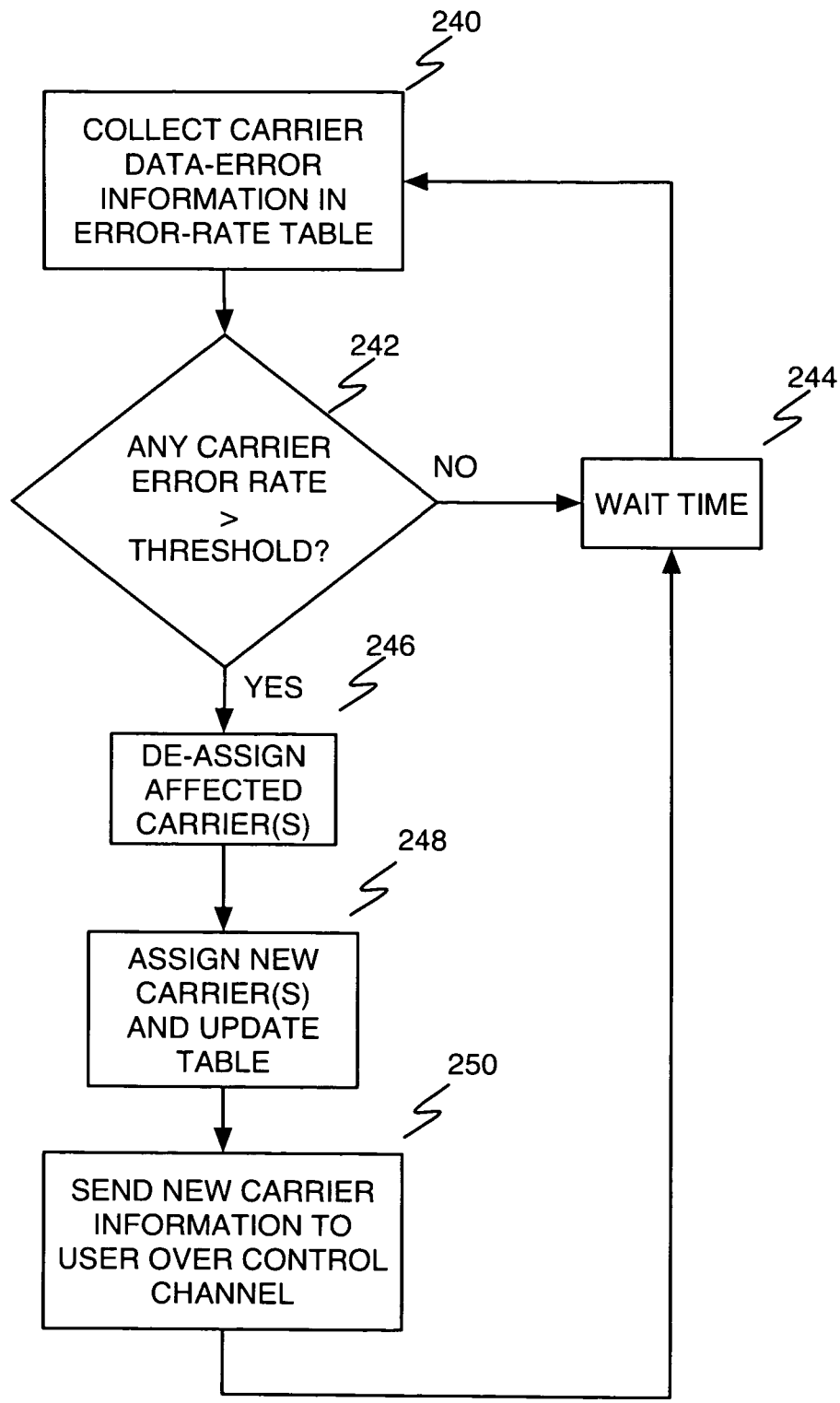
FIG. 16 is a flow diagram of an illustrative process according to the present invention for changing sinewave carrier frequencies in response to data errors exceeding a threshold.

An illustrative process for replacing noisy or otherwise high-error rate carriers is illustrated in FIG. 16. First, at reference numeral 240, the error rates of the carriers in use are collected. In the case of carriers that are used by the user cable modems to transmit data to the head end, the head end will monitor the individual error rates and store them, for example in an error-rate table. In the case of carriers that are used by the head end to transmit data to the user cable modems, the individual user cable modems will periodically report the error rates to the head end over the control channel for storage in the error-rate table. Next, at reference numeral 242, the entries in the error-rate table are compared with a threshold value. If no error rates are above the threshold, a wait time period is entered at reference numeral 244, after which the process returns to reference numeral 240.

If any carrier error rates are above the threshold, any affected carriers are de-assigned at reference numeral 246. New carrier frequencies are assigned and the carrier table is updated at reference numeral 248. The new frequencies can be implemented, either by directing the carrier generator controlling the affected carrier frequency to switch to a new frequency, or by deactivating the affected carrier generator and bringing an idle or spare carrier generator on line. Next, at reference numeral 250, the new carrier-frequency information is sent to the affected user modem(s) and the process again enters the wait time period at reference numeral 244.

In a similar manner, the carrier frequencies used for communication in the control channel can also be changed. Because disruption of communications over the control channels is more problematic that disruption of communications over the data channels, the process of FIG. 16 may not be adequate to assure continued operation of the system and other means may need to be used to switch control-channel frequencies.

According to one example, the head end 122 and the user cable modems 160 can be configured to implement any one of a number of algorithms to monitor one or more alternate control-channel carrier frequencies for control-channel information in the event that the primary control-channel carrier frequencies become noisy or are otherwise disrupted or fail. According to one variation of this scheme, the control channels in either the head end, the user cable modems, or both, can be configured to periodically send "I am alive" messages to the entity with whom they are communicating. In the event that receipt of one or more of these messages is not acknowledged by the receiving entity within the expected timing window, both parties can begin to transmit and listen on other preset alternate control-channel frequencies in some sequence for known intervals until an "I am alive" message is successfully acknowledged to establish a new control-channel frequency between the entities. According to this scheme, In yet another embodiment of the present invention, a number of transmit and receive carrier frequencies are employed in broadcast mode wherein the head end 122 transmits to all the user cable modems on all of its transmit frequencies and the user cable modems all listen on all of these receive frequencies. In this operating scheme, the user cable modems may all transmit on all of the head-end receiver frequencies. All traffic in such a system according to the present invention is packetized to identify the sender (or the intended recipient). The head end identifies the sender of received packets and the user cable modems selectively accept the data based on the header information as is well known in the art.

According to this operating scheme, both the head end 122 and all of the user cable modems can use known collision-avoidance techniques to choose transmit frequencies on the fly from among those not currently transmitting to assure efficient use of the total bandwidth.

Persons of ordinary skill in the art will appreciate that the provision for both packetized and non-packetized communications protocols in the coaxial-cable communications system of the present invention adds additional flexibility to the system and provides advantages in accordance with another aspect of the present invention. For example, Internet access via the user cable modems is advantageously accomplished using Internet communications protocol comprising IP protocol packet traffic. On the other hand, the system of the present invention may also be used to provide for downloading of data such as entertainment content to an individual user without the need to employ Internet protocol and its attendant high overhead.

As an example, the present invention can be employed to download video on demand for subscribers to a coaxial cable system according to the present invention. Video streaming presently requires a bandwidth of 19.7 Mbits/sec. Presently-available compression techniques can reduce this to about 11 Mbits/sec. Using the techniques of the present invention, real-time video streaming could be accomplished, for example, using a 16-bit/cycle 500 KHz carrier (8.0 Mbit/sec rate), a 16-bit/cycle 800 KHz carrier (12.8 Mbits/sec rate) for a total data rate of 20.8 Mbits/sec. Similarly, a single 16-bit/cycle carrier at 1.25 MHz can produce a data rate of 20 Mbits/sec.

Similarly, the outputs of several carriers could be combined to download in a very short time an entire feature-length movie to a hard drive video storage system such as are presently being sold by various vendors (e.g., Tivo®). A system configuread according to the present invention employing 16-bit/cycle carriers at 1 MHz, 1.3 MHz, 1.6 MHz, 1.9 MHz, and 2.2 MHz has a combined raw data transfer rate of 128 Mbits/sec, allowing for the download of a typical feature-length movie (such as fits on a 4.7 Gbyte DVD) in less than 40 seconds. Even if the data transfer is found to be more reliable at an 8-bits/cycle data-packing, the download time for such a feature-length movie increases to a maximum of less than 80 seconds. At present, this data would need to be buffered into memory such as a high-speed RAM FIFO since present-day hard drive systems cannot write data at such high bandwidths. Alternatively, a smaller memory such as a smaller high-speed RAM FIFO could be provided at the subscriber end and would be filled with high-speed data and then write it to the hard drive or to the video display hardware on demand. To provide uninterrupted viewing, the subscriber unit would communicate to the head end when it requires more data to be downloaded to avoid interrupting the program viewing.

As an example of the data rates that can be achieved using the present invention, a 200 KHz carrier having 16 bits per cycle imposed on it results in a raw data rate of 3.2 Mbits/sec. It is presently contemplated that carrier frequencies up to about 10 MHz or more can be employed in the present invention, although the number of bits that can be encoded and reliably decoded per cycle may become smaller than 16 at higher carrier frequencies. However, persons of ordinary skill in the art will appreciate that, at a data packing of as little as 2 bits per cycle, a carrier frequency of 10 MHZ can support a data rate of 20 Mbits/sec. Persons of ordinary skill in the art will appreciate that, at the lower end of the carrier-frequency spectrum (i.e., the audio spectrum), the limiting factor is a practical one in that the bit rate for lower-frequency carriers is obviously smaller.

As noted, a practical system that may be realized using the principles of the present invention will utilize a plurality of modulated sinewave carriers within a single communications channel. The individual carriers should be spaced apart in frequency to prevent interference. It is presently contemplated that a carrier spacing of about 300 KHz will be adequate for systems using presently-available demodulation technology.

As previously disclosed, the modulator and demodulator circuits shown in FIGS. 3 through 8 are only illustrative and other modulating and demodulating solutions are contemplated within the scope of the present invention. Persons of ordinary skill in the art will understand that digital signal processing techniques may be used in a communications system according to the present invention to produce at least one modulated sinusoidal carrier as shown in FIG. 2 and to demodulate the at least one sinusoidal carrier. Such DSP modulators and demodulators are shown in FIGS. 17 and 18, respectively.

The Fast Fourier Transform (FFT) a mathematical method of converting signals in the time domain to representations in the frequency domain. An Inverse Fast Fourier Transform (IFFT) reverses the process by taking frequency coefficients in the form of parallel digital data and converting them back to a continuous periodic signal in the time domain. The IFFT can be used to generate the modulated sinewave signals according to the present invention, and the FFT can be used to demodulate the modulated sinewave signals in accordance with the present invention. As will be appreciated by persons of ordinary skill in the art, the FFT and IFFT techniques for demodulation and modulation according to the present invention are useful up to frequencies where the processing engine clock speeds and A/D and D/A conversion speeds are about 6 times the frequency of the highest frequency modulated sinewave carrier to be modulated or demodulated.

Figure 17:
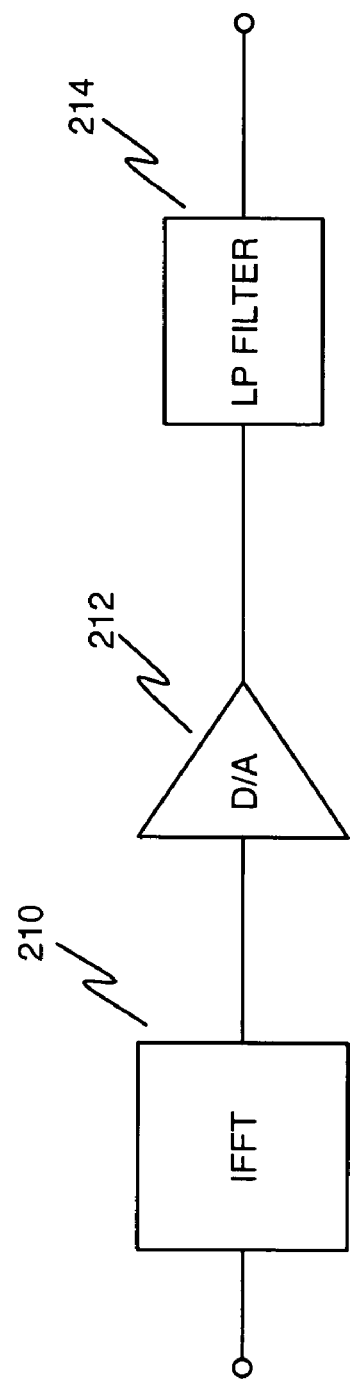
FIG. 17 is a block diagram illustrating how digital signal processing techniques may be used in a communications system according to the present invention to produce at least one modulated sinusoidal carrier as shown in FIG. 2.

Referring now to FIG. 17, frequency coefficients are presented to IFFT block 210. Known DSP techniques are used to configure IFFT block 210. The IFFT modulates the digital representation of each audio carrier into the precise elemental phase shifted signals required. The time domain data output from IFFT block 210 is then fed to a Digital to Analog (D/A) converter 212 to create a time domain signal. Typical resolution for the IFFT block 210 and the D/A converter 212 is more than about 8 bits. The D/A converter 212 should be fast enough to perform at least 100K conversions per second The output of the D/A converter is filtered by low-pass filter 214. Filtering of the output signal is constrained to removing the high frequency noise without impairing the information content of each carrier. To this end, low-pass filter 214 may be implemented, for example, as a 6-pole butterworth filter or as a zero-group-delay realization with 60 dB/octave rolloff.

Figure 18:
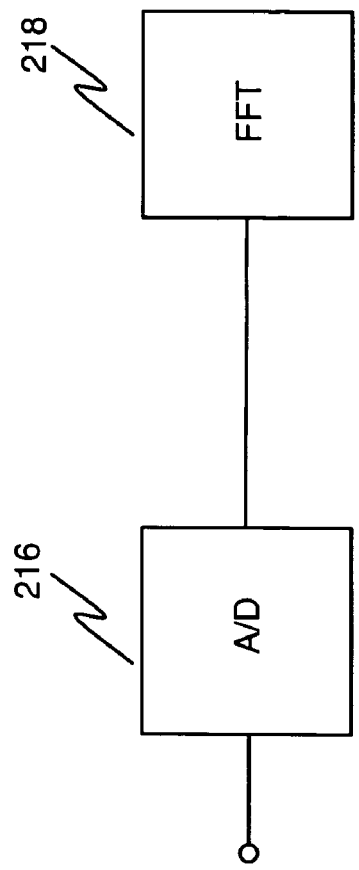
FIG. 18 is a block diagram illustrating how digital signal processing techniques may be used in a communications system according to the present invention to demodulate at least one modulated sinusoidal carrier.

Referring now to FIG. 18, a FFT DSP embodiment of a demodulator circuit according to the present invention is disclosed. FFT technologies are well known in the art. The demodulator circuit comprises A/D converter 216 and FFT block 218.

Figure 19:
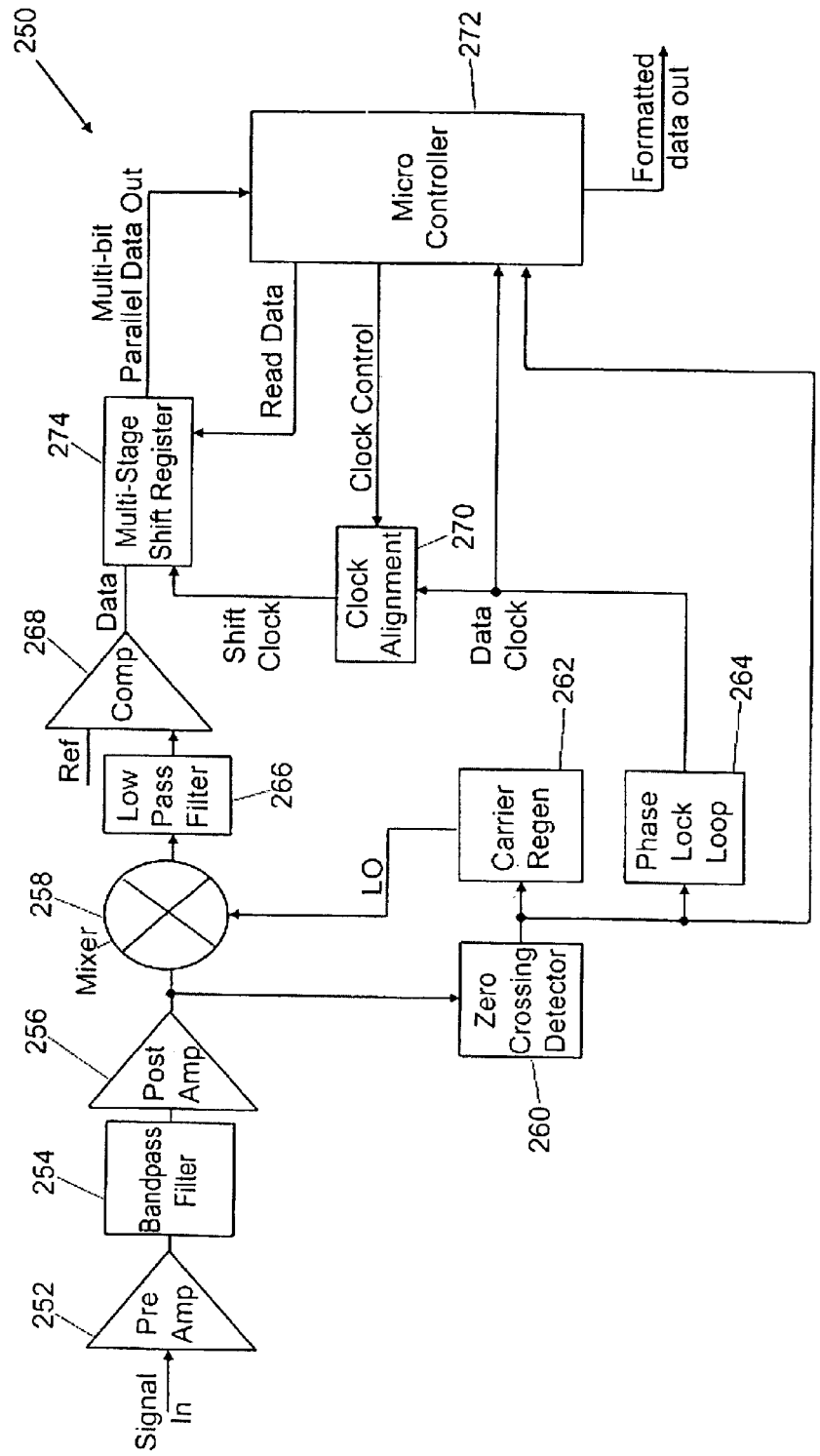
FIG. 19 is a block diagram that depicts an illustrative embodiment of a multi-frequency sinewave receiver.

Referring now to FIG. 19, a block diagram depicts an illustrative of a multi-frequency sinewave receiver 250. This drawing and associated description is for the reception of one of many carriers used in a multi-frequency system. An actual system would have several of these receivers working together on different frequencies to transfer vast amounts of data using this modulation technique.

Preamplifier 252 amplifies the incoming signal to compensate for the insertion loss of the band pass filter 254. Band pass filter 254 filters the signal to reduce out-of-band interference. Post amplifier 256 amplifies the filtered signal to compensate for the insertion loss of the Bandpass filter 254 and raises the signal level to that needed by the balanced mixer 258.

A double balanced mixer 258 mixes the incoming signal with the output of a local oscillator producing the sum and difference of the two signals. The local oscillator may be formed from a zero crossing detector 260 that produces an output when the incoming signal crosses the zero-volt level. The zero crossing detector 260 is used to generate the reference for the carrier regenerator 262 that acts as the local oscillator and the phase lock loop 264 which generates the data clock. The carrier regenerator takes the output of the zero crossing detector and creates a local oscillator output which is the same frequency and phase of that of the incoming signal. Phase locked loop 264 uses the output of the zero crossing detector 260 to generate a high frequency clock used to clock the retrieved data at the output of the comparator.

Low pass filter 266 removes the sum frequency component form the output of the mixer 258, leaving the difference component which is representative of the absolute phase difference between the input signal and the reference signal out of the local oscillator. Comparator 268 compares the difference signal from the mixer to a fixed reference producing an output when the input signal is higher than the reference signal. An output indicates there is a phase difference between input and local oscillator indicating the presence of a data bit of value "one".

Clock alignment block 270 under the control of the microcontroller 272 aligns the data clock through a variable delay circuit. Using a prior knowledge of where in the phase of the signal the data bits are, this circuit filters out data clock pulses which are not in alignment with known valid data bits coming out of the comparator. The data is clocked into the multi-stage shift register 274 that is used as a gathering repository for the data bits clocked in from the output of the comparator 268. Microcontroller 272 is a preprogrammed device which monitors and controls the operation of the receiver. Microcontroller 272 transfers the received data stored in the shift register out to other areas.

Microcontroller 272 also detects "out-of-position" bits and reports their detection as an event that may be used by the system as disclosed herein.

While the invention has been described with reference to an exemplary embodiment, it will be understood by those skilled in the art that various changes may be made and equivalents may be substituted for elements thereof without departing from the scope of the invention.

What is claimed is:

1. A head end for a coaxial cable communications system employing single and multiple sinewave modulation techniques including:

a data backbone interface;

a controller;

a database coupled to the controller;

a control channel coupled to the controller;

an internal data bus and an internal control bus coupled to the controller and the data backbone interface;

a coaxial cable;

a plurality of sinewave carrier generators/modulators/combiner coupled to the internal data bus and an internal control bus and the coaxial cable;

a plurality of receivers/detectors coupled to the internal data bus and an internal control bus and the coaxial cable;

wherein each sinewave carrier generators/modulators/combiner includes an encoder for generating at least one substantially sinusoidal waveform containing encoded digital data at selected phase angles $\theta_n$, the waveform having an amplitude $Y=\sin\theta$ at phase angles lying outside of data regions, the waveform having an amplitude $Y=\sin\theta$ at phase angles lying inside the data regions having a range of $\Delta\theta$ beginning at each phase angle $\theta_n$ where data of the first value is to be encoded, the waveform having an amplitude Y defined by a function different from $Y=\sin\theta$ at phase angles lying inside the data regions having a range of $\Delta\theta$ associated with each phase angle $\theta_n$ where data of the second value is to be encoded, and a combiner for combining the substantially sinusoidal waveforms and driving them onto the coaxial cable; and wherein each receiver detector includes a receiver for receiving through the coaxial cable a plurality of substantially sinusoidal waveforms containing encoded digital data and a decoder for extracting the digital data from each of the substantially sinusoidal waveforms containing encoded digital data.

2. A subscriber cable modem for a coaxial cable communications system employing single and multiple sinewave modulation techniques including:

an internal bus;
a controller coupled to the internal bus;
a hardware ID unit coupled to the internal bus;
a non-volatile memory coupled to the internal bus;
a computer interface coupled to the internal bus;
a control channel transceiver coupled to the internal bus;
a multichannel transceiver coupled to the internal bus;
wherein the control channel transceiver and the multichannel transceiver each include circuitry for an encoder for generating at least one substantially sinusoidal waveform containing encoded digital data at selected phase angles $\theta_n$, the waveform having an amplitude $Y=\sin\theta$ at phase angles lying outside of data regions, the waveform having an amplitude $Y=\sin\theta$ at phase angles lying inside the data regions having a range of $\Delta\theta$ beginning at each phase angle $\theta_n$ where data of the first value is to be encoded, the waveform having an amplitude Y defined by a function different from $Y=\sin\theta$ at phase angles lying inside the data regions having a range of $\Delta\theta$ associated with each phase angle $\theta_n$ where data of the second value is to be encoded, and a combiner for combining the substantially sinusoidal waveforms and driving them onto the coaxial cable and a receiver for receiving through the coaxial cable at least one substantially sinusoidal waveform containing encoded digital data and a decoder for extracting the digital data from each of the substantially sinusoidal waveforms containing encoded digital data.

3. In a coaxial cable communications system including a head end employing single and multiple sinewave modulation techniques, a method for initiating a session with a subscriber cable modem including:

receiving a session-start attempt from a user cable modem generating a modulated waveform comprising a substantially sinusoidal waveform containing encoded digital data at selected phase angles $\theta_n$, the waveform having an amplitude $Y=\sin\theta$ at phase angles lying outside of data regions, the waveform having an amplitude $Y=\sin\theta$ at phase angles lying inside the data regions having a range of $\Delta\theta$ beginning at each phase angle $\theta_n$ where data of the first value is to be encoded, the waveform having an amplitude Y defined by a function different from $Y=\sin\theta$ at phase angles lying inside the data regions having a range of $\Delta\theta$ associated with each phase angle $\theta_n$ where data of the second value is to be encoded;

querying a database for authorization of the user;
verifying a user ID and password if the user cable modem hardware is known;
sending data indicating a session authorization to the user cable modem using the modulated waveform if the user ID and password are verified;
sending data indicating a session refusal message to the user cable modem using the modulated waveform if the user ID and password are not verified; and
sending a new-account browser page to the user cable modem using the modulated waveform if the user cable modem hardware is unknown.

* * * * *